(12) United States Patent
Keating et al.

(10) Patent No.: US 11,936,872 B2
(45) Date of Patent: Mar. 19, 2024

(54) IMAGE DATA ENCODING AND DECODING

(71) Applicant: Sony Group Corporation, Tokyo (JP)

(72) Inventors: Stephen Mark Keating, Basingstoke (GB); Karl James Sharman, Basingstoke (GB); Adrian Richard Browne, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 201 days.

(21) Appl. No.: 17/619,997

(22) PCT Filed: Jun. 24, 2020

(86) PCT No.: PCT/GB2020/051534
§ 371 (c)(1),
(2) Date: Dec. 16, 2021

(87) PCT Pub. No.: WO2020/260876
PCT Pub. Date: Dec. 30, 2020

(65) Prior Publication Data
US 2022/0182637 A1 Jun. 9, 2022

(30) Foreign Application Priority Data
Jun. 25, 2019 (GB) ..................................... 1909146

(51) Int. Cl.
*H04N 19/132* (2014.01)
*H04N 19/13* (2014.01)
(Continued)

(52) U.S. Cl.
CPC ........... *H04N 19/132* (2014.11); *H04N 19/13* (2014.11); *H04N 19/159* (2014.11); *H04N 19/46* (2014.11)

(58) Field of Classification Search
CPC .... H04N 19/132; H04N 19/13; H04N 19/159; H04N 19/46; H04N 19/50; H04N 19/61;
(Continued)

(56) References Cited

U.S. PATENT DOCUMENTS

2006/0017592 A1   1/2006   Shim et al.
2013/0107969 A1   5/2013   Nguyen et al.
(Continued)

FOREIGN PATENT DOCUMENTS

EP   1 619 901 A2   1/2006
EP   3 264 763 A1   1/2018

OTHER PUBLICATIONS

International Search Report dated Oct. 2, 2020 in PCT/GB2020/051534 filed Jun. 24, 2020, 3 pages.
(Continued)

*Primary Examiner* — Farzana Hossain
(74) *Attorney, Agent, or Firm* — Oblon, McClelland, Maier & Neustadt, L.L.P.

(57) ABSTRACT

Apparatus comprises a data encoder configured to derive, from an array of sample values, sample range flags each indicative of whether one or more sample values of the array of sample values lie in a predetermined range of sample values, the data encoder being configured in a first encoding mode to encode the array of sample values, at least in part, by encoding the sample range flags to an output data stream; a predictor configured to predict the state of a group of the sample range flags for a given array of sample values, the group being at least a subset of the sample range flags; and a comparator configured to compare the predicted state of the group of sample range flags with the actual state of the respective sample range flags for the given array of sample values; the data encoder being configured, in response to the comparator, to encode the given array of samples values in
(Continued)

a second encoding mode in which the encoder is configured to encode to the output data stream a predetermined number of indicator flags, fewer than the group of sample range flags, to indicate whether the predicted state of the group of sample range flags is the same as the actual state of the group of sample range flags for the given array of sample values.

20 Claims, 16 Drawing Sheets

(51) Int. Cl.
*H04N 19/159* (2014.01)
*H04N 19/46* (2014.01)
(58) Field of Classification Search
CPC .... H04N 19/645; H04N 19/18; H04N 19/103; H04N 19/136; H04N 19/14; H04N 19/176; H04N 19/182; H04N 19/184; H04N 19/70; H03M 7/30; H03M 7/4031
See application file for complete search history.

(56) References Cited

U.S. PATENT DOCUMENTS

| | | |
|---|---|---|
| 2015/0010077 A1 | 1/2015 | Kumakura et al. |
| 2015/0189280 A1 | 7/2015 | Nguyen et al. |
| 2016/0050427 A1* | 2/2016 | Berry ............... H04N 19/42 |
| | | 375/240.01 |
| 2018/0152704 A1 | 5/2018 | Nguyen et al. |
| 2019/0124329 A1 | 4/2019 | Nguyen et al. |
| 2020/0260081 A1 | 8/2020 | Nguyen et al. |

OTHER PUBLICATIONS

Sole, J., et al., "Transform Coefficient Coding in HEVC", IEEE Transactions on Circuits and Systems for Video TEchnology, vol. 22, No. 12, 2012, pp. 1765-1777.

BrossS, B., et al., "High efficiency video coding (HEVC) text specification draft 6", ISO/IEC, JCTVC-H1003, 2012, 259 total pages.

* cited by examiner

IMAGE DATA ENCODING AND DECODING

BACKGROUND

Field

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 Mbit/s.

SUMMARY

The present disclosure addresses or mitigates problems arising from this processing.

This disclosure provides apparatus comprising:

a data encoder configured to derive, from an array of sample values, sample range flags each indicative of whether one or more sample values of the array of sample values lie in a predetermined range of sample values, the data encoder being configured in a first encoding mode to encode the array of sample values, at least in part, by encoding the sample range flags to an output data stream;

a predictor configured to predict the state of a group of the sample range flags for a given array of sample values, the group being at least a subset of the sample range flags; and a comparator configured to compare the predicted state of the group of sample range flags with the actual state of the respective sample range flags for the given array of sample values;

the data encoder being configured, in response to the comparator, to encode the given array of samples values in a second encoding mode in which the encoder is configured to encode to the output data stream a predetermined number of indicator flags, fewer than the group of sample range flags, to indicate whether the predicted state of the group of sample range flags is the same as the actual state of the group of sample range flags for the given array of sample values.

This disclosure also provides apparatus comprising:

a data decoder configured, in a first decoding mode, to decode an array of sample values, at least in part, from sample range flags in an input data stream each indicative of whether one or more sample values of the array of sample values lie in a predetermined range of sample values; and a predictor configured to predict the state of a group of the sample range flags for a given array of sample values, the group being at least a subset of the sample range flags;

the data decoder being configured to decode the given array of samples values in a second encoding mode in which the data decoder is configured to detect in the input data stream a predetermined number of indicator flags, fewer than the group of sample range flags, indicating whether the predicted state of the group of sample range flags is the same as the actual state of the group of sample range flags for the given array of sample values.

This disclosure also provides a method comprising:

deriving, from an array of sample values, sample range flags each indicative of whether one or more sample values of the array of sample values lie in a predetermined range of sample values;

encoding, in a first encoding mode, the array of sample values, at least in part, by encoding the sample range flags to an output data stream;

predicting the state of a group of the sample range flags for a given array of sample values, the group being at least a subset of the sample range flags;

comparing the predicted state of the group of sample range flags with the actual state of the respective sample range flags for the given array of sample values; and in response to the comparing step, encoding the given array of samples values in a second encoding mode by encoding to the output data stream a predetermined number of indicator flags, fewer than the group of sample range flags, to indicate whether the predicted state of the group of sample range flags is the same as the actual state of the group of sample range flags for the given array of sample values.

This disclosure also provides a method comprising:

decoding, in a first decoding mode, to decode an array of sample values, at least in part, from sample range flags in an input data stream each indicative of whether one or more sample values of the array of sample values lie in a predetermined range of sample values;

predicting the state of a group of the sample range flags for a given array of sample values, the group being at least a subset of the sample range flags;

decoding the given array of samples values in a second encoding mode in which the data decoder is configured to detect in the input data stream a predetermined number of indicator flags, fewer than the group of sample range flags, indicating whether the predicted state of the group of sample range flags is the same as the actual state of the group of sample range flags for the given array of sample values.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
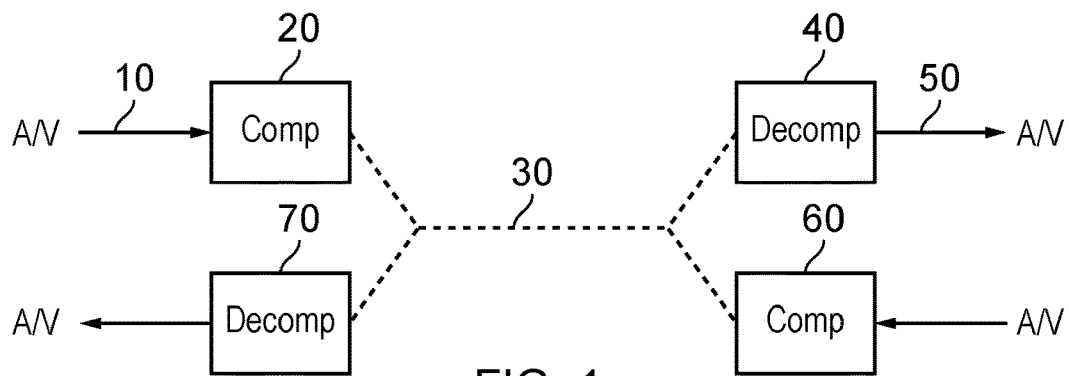
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
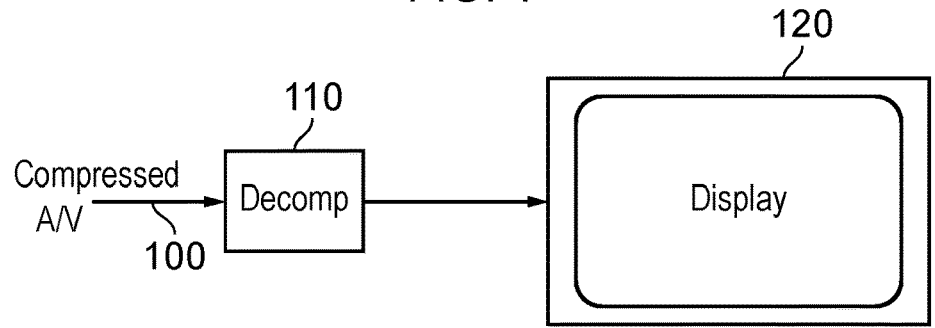
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
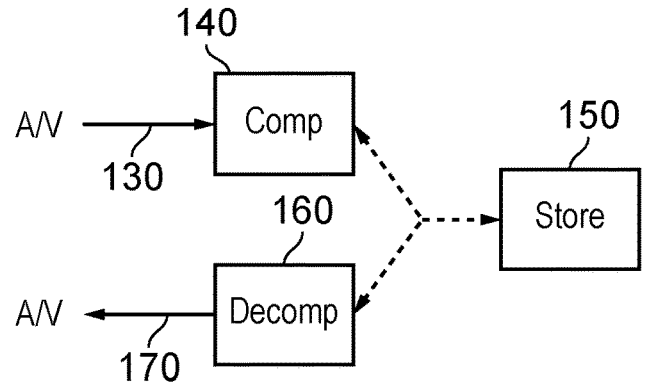
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
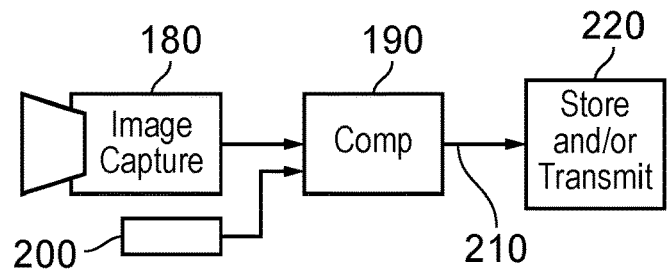
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
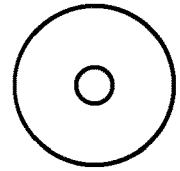
FIGS. 5 and 6 schematically illustrate storage media.
Figure 6:
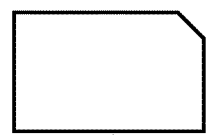

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
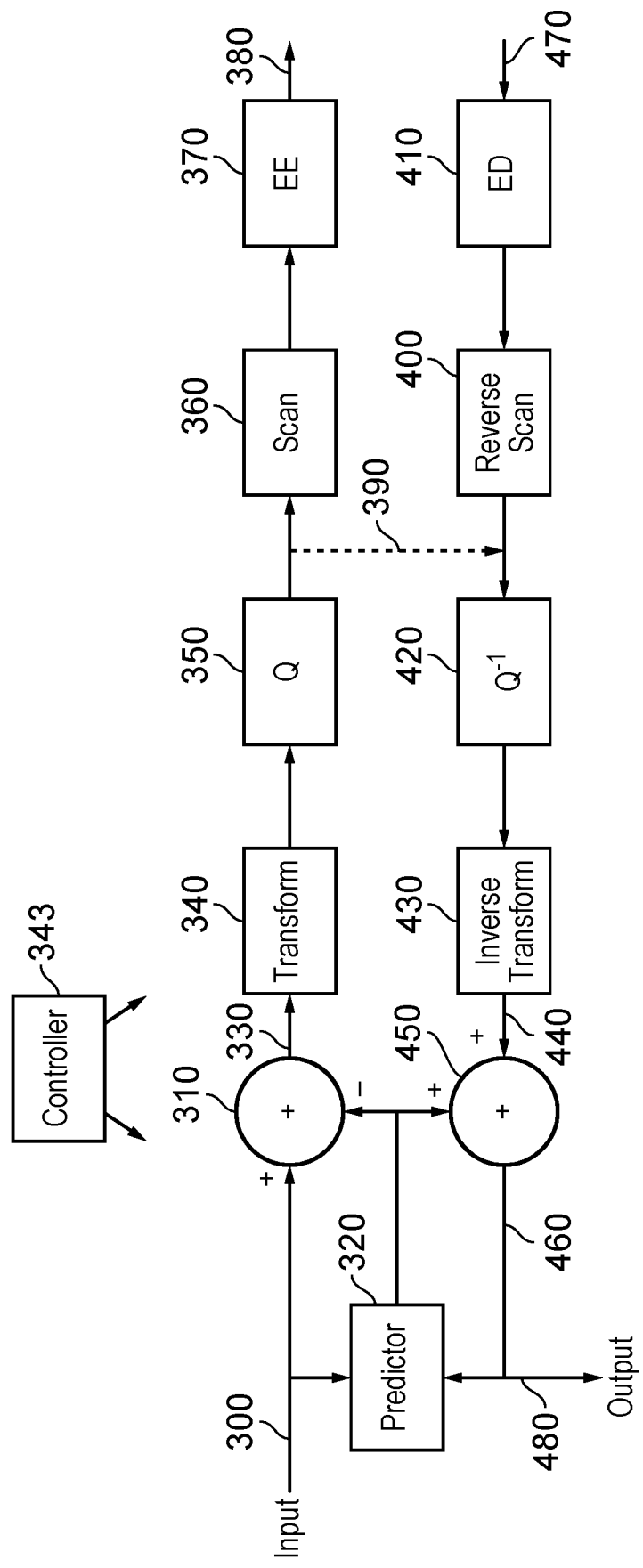
FIG. 7 provides a schematic overview of a video data compression and decompression apparatus.

FIG. 7 provides a schematic overview of a video data compression and decompression apparatus.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

The remainder of the apparatus acting as an encoder (to encode the residual or difference image) will now be described. The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
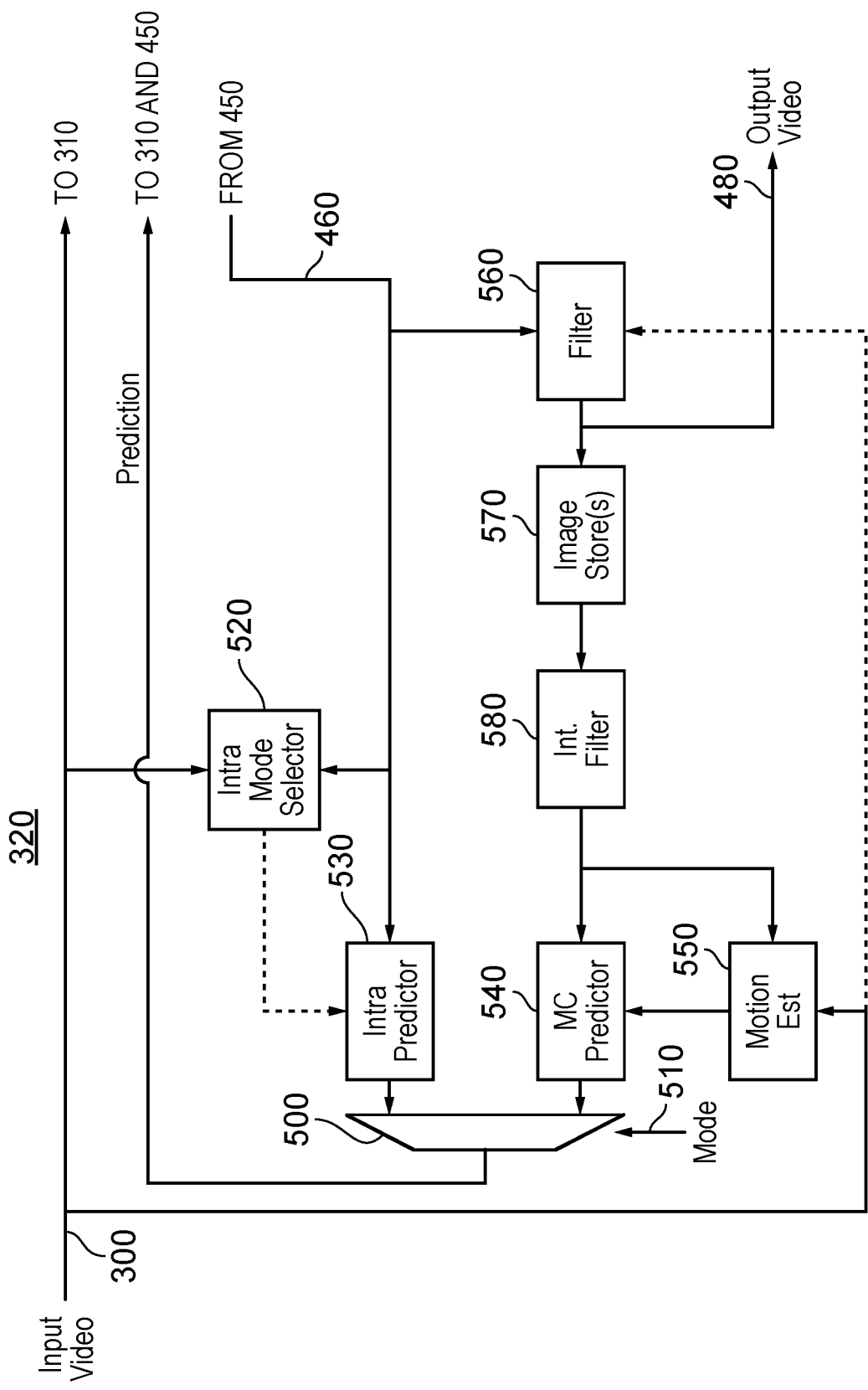
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in Bross et al: "High Efficiency Video Coding (HEVC) text specification draft 6", JCTVC-H1003_d0 (November 2011), the contents of which are incorporated herein by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

The intra-prediction process will now be discussed. In general terms, intra-prediction involves generating a prediction of a current block of samples from previously-encoded and decoded samples in the same image.

Figure 9:
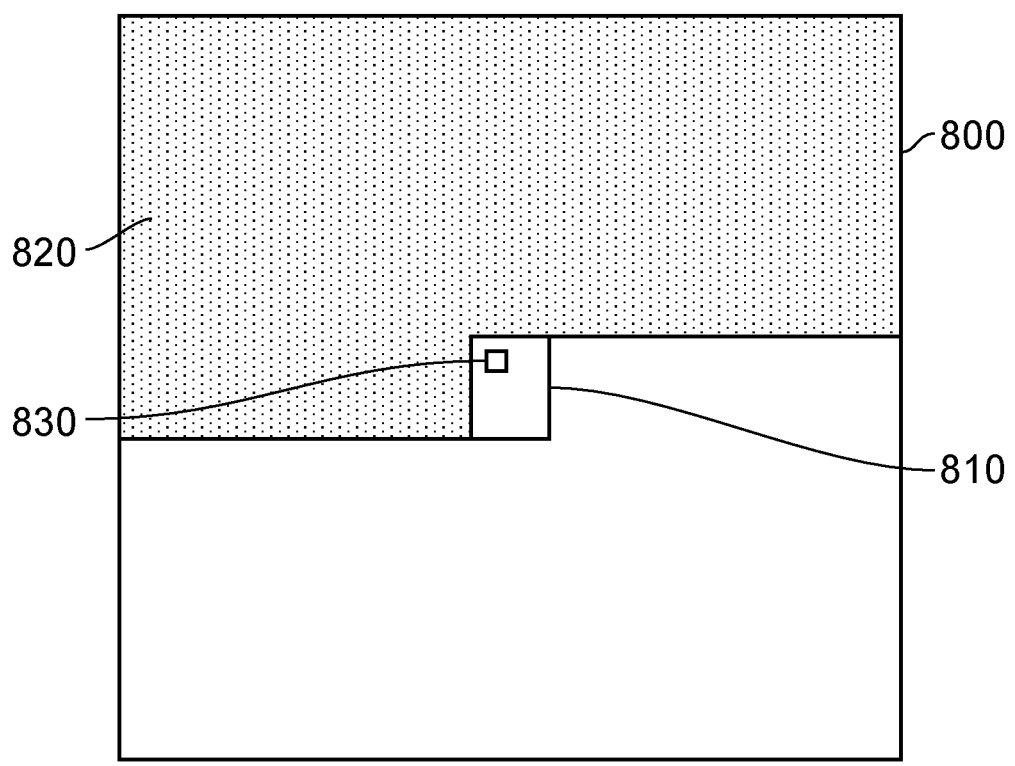
FIG. 9 schematically illustrates a partially-encoded image.

FIG. 9 schematically illustrates a partially encoded image 800. Here, the image is being encoded from top-left to bottom-right on a block by block basis. An example block encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

In some examples, the image is encoded on a block by block basis such that larger blocks (referred to as coding units or CUs) are encoded in an order such as the order discussed with reference to FIG. 9. Within each CU, there is the potential (depending on the block splitting process that has taken place) for the CU to be handled as a set of two or more smaller blocks or transform units (TUs). This can give a hierarchical order of encoding so that the image is encoded on a CU by CU basis, and each CU is potentially encoded on a TU by TU basis. Note however that for an individual TU within the current coding tree unit (the largest node in the tree structure of block division), the hierarchical order of encoding (CU by CU then TU by TU) discussed above means that there may be previously encoded samples in the current CU and available to the coding of that TU which are, for example, above-right or below-left of that TU.

The block 810 represents a CU; as discussed above, for the purposes of intra-image prediction processing, this may be subdivided into a set of smaller units. An example of a current TU 830 is shown within the CU 810. More generally, the picture is split into regions or groups of samples to allow efficient coding of signalling information and transformed data. The signalling of the information may require a different tree structure of sub-divisions to that of the transform, and indeed that of the prediction information or the prediction itself. For this reason, the coding units may have a different tree structure to that of the transform blocks or regions, the prediction blocks or regions and the prediction information. In some examples such as HEVC the structure can be a so-called quad tree of coding units, whose leaf nodes contain one or more prediction units and one or more transform units; the transform units can contain multiple transform blocks corresponding to luma and chroma representations of the picture, and prediction could be considered to be applicable at the transform block level. In examples, the parameters applied to a particular group of samples can be considered to be predominantly defined at a block level, which is potentially not of the same granularity as the transform structure.

The intra-image prediction takes into account samples coded prior to the current TU being considered, such as those above and/or to the left of the current TU. Source samples, from which the required samples are predicted, may be located at different positions or directions relative to the current TU. To decide which direction is appropriate for a current prediction unit, the mode selector 520 of an example encoder may test all combinations of available TU structures for each candidate direction and select the prediction direction and TU structure with the best compression efficiency.

The picture may also be encoded on a "slice" basis. In one example, a slice is a horizontally adjacent group of CUs. But in more general terms, the entire residual image could form a slice, or a slice could be a single CU, or a slice could be a row of CUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 10:
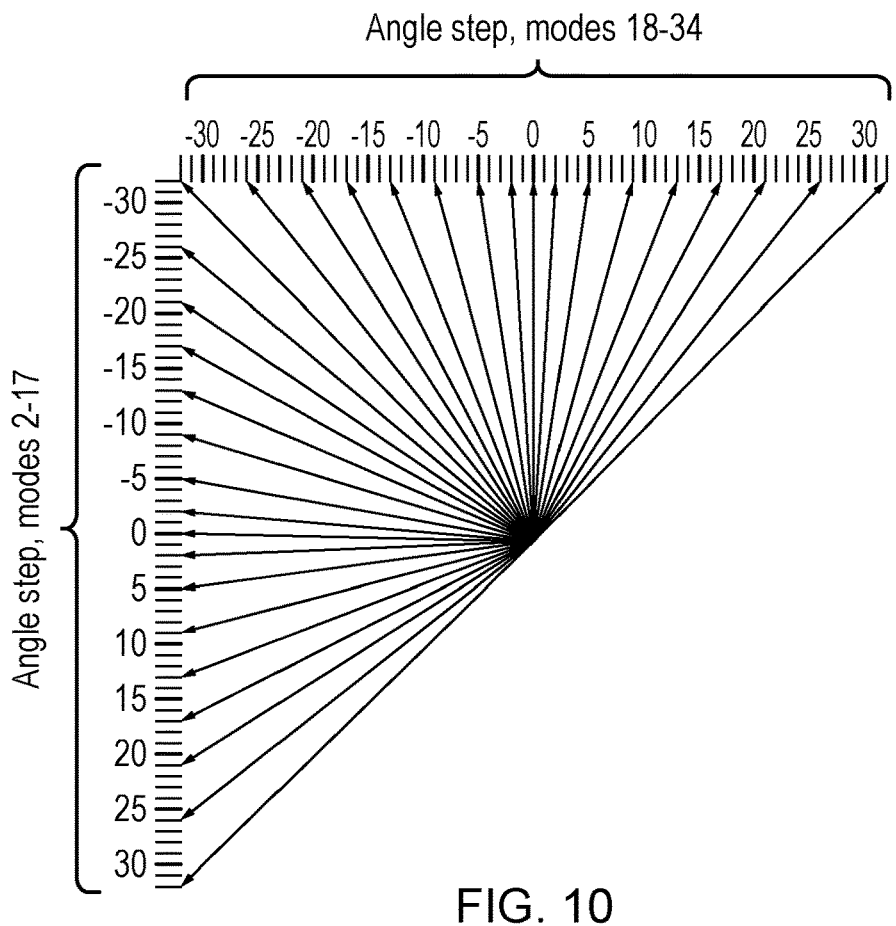
FIG. 10 schematically illustrates a set of possible intra-prediction directions.
Figure 11:
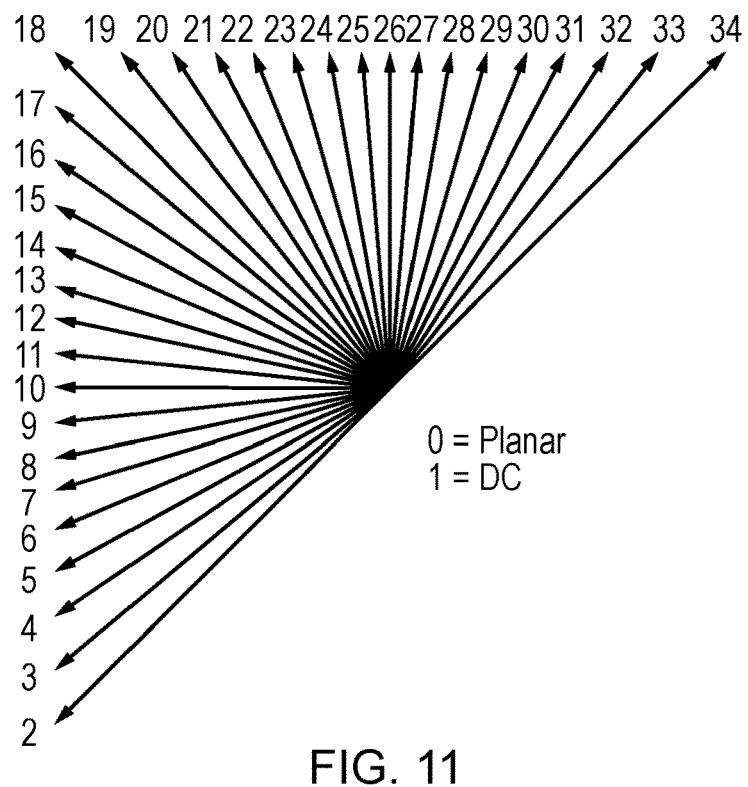
FIG. 11 schematically illustrates a set of prediction modes.

FIG. 10 schematically illustrates a set of possible (candidate) prediction directions. The full set of candidate directions is available to a prediction unit. The directions are determined by horizontal and vertical displacement relative to a current block position, but are encoded as prediction "modes", a set of which is shown in FIG. 11. Note that the so-called DC mode represents a simple arithmetic mean of the surrounding upper and left-hand samples. Note also that the set of directions shown in FIG. 10 is just one example; in other examples, a set of (for example) 65 angular modes plus DC and planar (a full set of 67 modes) as shown schematically in FIG. 12 makes up the full set. Other numbers of modes could be used.

In general terms, after detecting a prediction direction, the systems are operable to generate a predicted block of samples according to other samples defined by the prediction direction. In examples, the image encoder is configured to encode data identifying the prediction direction selected for each sample or region of the image (and the image decoder is configured to detect such data).

Figure 13:
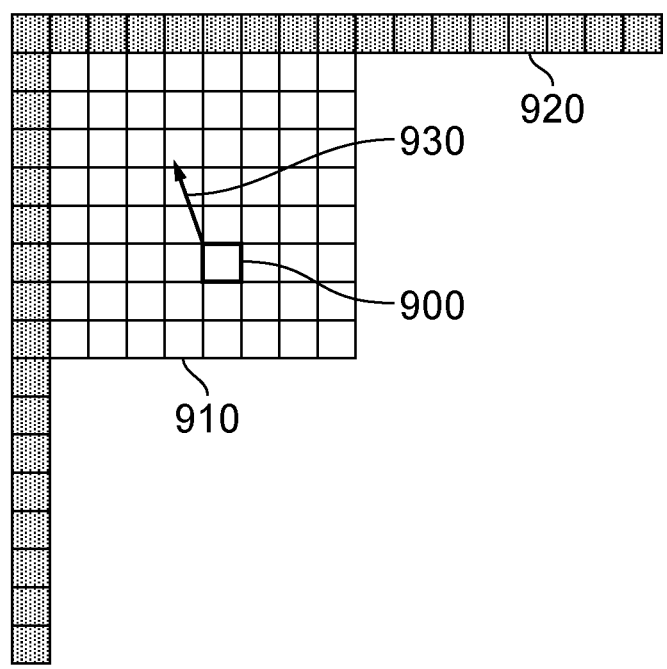
FIG. 13 schematically illustrates an intra-prediction process.

FIG. 13 schematically illustrates an intra-prediction process in which a sample 900 of a block or region 910 of samples is derived from other reference samples 920 of the same image according to a direction 930 defined by the intra-prediction mode associated with that sample. The reference samples 920 in this example come from blocks above and to the left of the block 910 in question and the predicted value of the sample 900 is obtained by tracking along the direction 930 to the reference samples 920. The direction 930 might point to a single individual reference sample but in a more general case an interpolated value between surrounding reference samples is used as the prediction value. Note that the block 910 could be square as shown in FIG. 13 or could be another shape such as rectangular.

Figure 14:
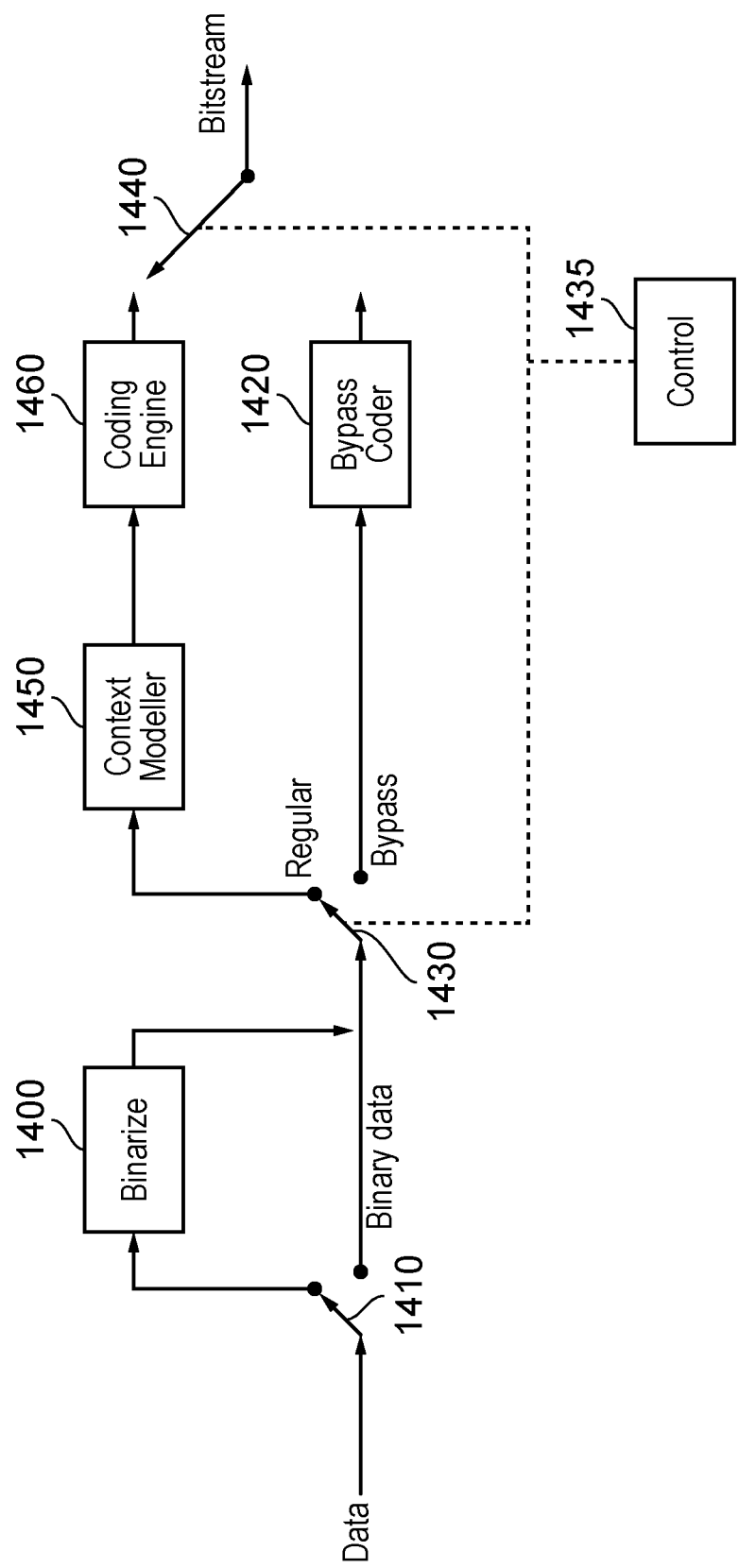
FIG. 14 schematically illustrates a CABAC encoder.
Figure 15:
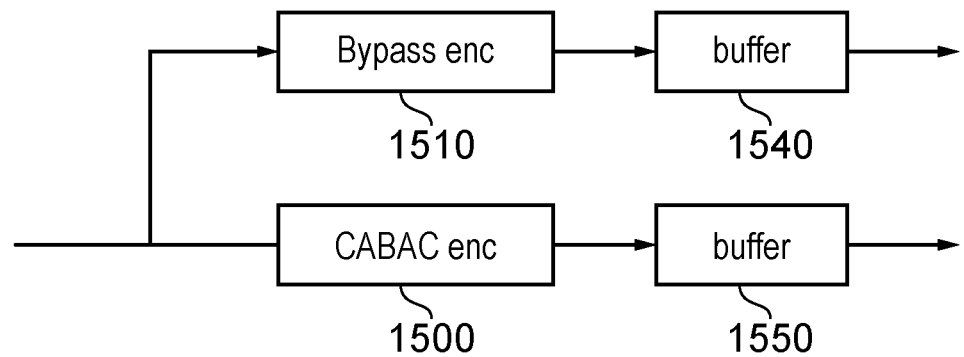
FIGS. 15 and 16 schematically illustrate CABAC encoding techniques.

FIGS. 14 and 15 schematically illustrate a previously proposed reference sample projection process.

In FIGS. 14 and 15, a block or region 1400 of samples to be predicted is surrounded by linear arrays of reference samples from which the intra prediction of the predicted samples takes place. The reference samples 1410 are shown as shaded blocks in FIGS. 14 and 15, and the samples to be predicted are shown as unshaded blocks. Note that an 8×8 block or region of samples to be predicted is used in this example, but the techniques are applicable to variable block sizes and indeed block shapes.

As mentioned, the reference samples comprise at least two linear arrays in respective orientations with respect to the current image region of samples to be predicted. For example, the linear arrays may be an array or row 1420 of samples above the block of samples to be predicted and an array or column 1430 of samples to the left of the block of samples to be predicted.

Figure 12:
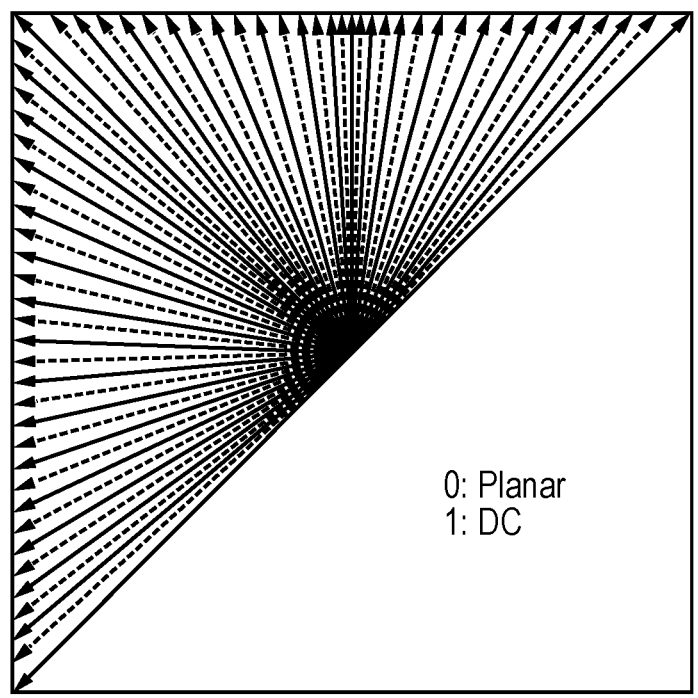
FIG. 12 schematically illustrates another set of prediction modes.

As discussed above with reference to FIG. 13, the reference sample arrays can extend beyond the extent of the block to be predicted, in order to provide for prediction modes or directions within the range indicated in FIGS. 10-12. Where necessary, if previously decoded samples are not available for use as reference samples at particular reference sample positions, other reference samples can be re-used at those missing positions. Reference sample filtering processes can be used on the reference samples.

FIG. 14 schematically illustrates the operation of a CABAC entropy encoder.

The CABAC encoder operates in respect of binary data, that is to say, data represented by only the two symbols 0 and 1. The encoder makes use of a so-called context modelling process which selects a "context" or probability model for subsequent data on the basis of previously encoded data. The selection of the context is carried out in a deterministic way so that the same determination, on the basis of previously decoded data, can be performed at the decoder without the need for further data (specifying the context) to be added to the encoded datastream passed to the decoder.

Referring to FIG. 14, input data to be encoded may be passed to a binary converter 1400 if it is not already in a binary form; if the data is already in binary form, the converter 1400 is bypassed (by a schematic switch 1410). In the present embodiments, conversion to a binary form is actually carried out by expressing the quantised DCT coefficient data as a series of binary "maps", which will be described further below.

The binary data may then be handled by one of two processing paths, a "regular" and a "bypass" path (which are shown schematically as separate paths but which, in embodiments of the invention discussed below, could in fact be implemented by the same processing stages, just using slightly different parameters). The bypass path employs a so-called bypass coder 1420 which does not necessarily make use of context modelling in the same form as the regular path. In some examples of CABAC coding, this bypass path can be selected if there is a need for particularly rapid processing of a batch of data, but in the present embodiments two features of so-called "bypass" data are noted: firstly, the bypass data is handled by the CABAC encoder (950, 1460), just using a fixed context model representing a 50% probability; and secondly, the bypass data relates to certain categories of data, one particular example being coefficient sign data. Otherwise, the regular path is selected by schematic switches 1430, 1440 operating under the control of control circuitry 1435. This involves the data being processed by a context modeller 1450 followed by a coding engine 1460.

The entropy encoder shown in FIG. 14 encodes a block of data (that is, for example, data corresponding to a block of coefficients relating to a block of the residual image) as a single value if the block is formed entirely of zero-valued data. For each block that does not fall into this category, that is to say a block that contains at least some non-zero data, a "significance map" is prepared. The significance map indicates whether, for each position in a block of data to be encoded, the corresponding coefficient in the block is non-zero. The significance map data, being in binary form, is itself CABAC encoded. The use of the significance map assists with compression because no data needs to be encoded for a coefficient with a magnitude that the significance map indicates to be zero. Also, the significance map can include a special code to indicate the final non-zero coefficient in the block, so that all of the final high frequency/trailing zero coefficients can be omitted from the encoding. The significance map is followed, in the encoded bitstream, by data defining the values of the non-zero coefficients specified by the significance map.

Further levels of map data are also prepared and are encoded. An example is a map which defines, as a binary value (1=yes, 0=no) whether the coefficient data at a map position which the significance map has indicated to be "non-zero" actually has the value of "one". Another map specifies whether the coefficient data at a map position which the significance map has indicated to be "non-zero" actually has the value of "two". A further map indicates, for those map positions where the significance map has indicated that the coefficient data is "non-zero", whether the data has a value of "greater than two". Another map indicates, again for data identified as "non-zero", the sign of the data value (using a predetermined binary notation such as 1 for +, 0 for −, or of course the other way around).

In embodiments of the invention, the significance maps and the other maps are allocated in a predetermined manner either to the CABAC encoder or to the bypass encoder, and are all representative of different respective attributes or value ranges of the same initial data items. In one example, at least the significance map is CABAC encoded and at least some of the remaining maps (such as the sign data) are bypass encoded. Accordingly, each data item is split into respective subsets of data and the respective subsets are encoded by first (for example, CABAC) and second (for example, bypass) encoding systems. The nature of the data and of the CABAC and bypass encoding is such that for a predetermined quantity of CABAC encoded data, a variable quantity of zero or more bypass data is generated in respect of the same initial data items. So, for example, if the quantised, reordered DCT data contains substantially all zero values, then it may be that no bypass data or a very small quantity of bypass data is generated, because the bypass data concerns only those map positions for which the significance map has indicated that the value is non-zero. In another example, in quantised reordered DCT data having many high value coefficients, a significant quantity of bypass data might be generated.

In embodiments of the invention, the significance map and other maps are generated from the quantised DCT coefficients, for example by the scan unit 360, and is subjected to a zigzag scanning process (or a scanning process selected from zigzag, horizontal raster and vertical raster scanning according to the intra-prediction mode) before being subjected to CABAC encoding.

In general terms, CABAC encoding involves predicting a context, or a probability model, for a next bit to be encoded, based upon other previously encoded data. If the next bit is the same as the bit identified as "most likely" by the probability model, then the encoding of the information that "the next bit agrees with the probability model" can be encoded with great efficiency. It is less efficient to encode that "the next bit does not agree with the probability model", so the derivation of the context data is important to good operation of the encoder. The term "adaptive" means that the context or probability models are adapted, or varied during encoding, in an attempt to provide a good match to the (as yet uncoded) next data.

Using a simple analogy, in the written English language, the letter "U" is relatively uncommon. But in a letter position immediately after the letter "Q", it is very common indeed. So, a probability model might set the probability of a "U" as a very low value, but if the current letter is a "Q", the probability model for a "U" as the next letter could be set to a very high probability value.

CABAC encoding is used, in the present arrangements, for at least the significance map and the maps indicating whether the non-zero values are one or two. Bypass processing—which in these embodiments is identical to CABAC encoding but for the fact that the probability model is fixed at an equal (0.5:0.5) probability distribution of 1s and 0s, is used for at least the sign data and the map indicating whether a value is >2. For those data positions identified as >2, a separate so-called escape data encoding can be used to encode the actual value of the data. This may include a Golomb-Rice encoding technique.

The CABAC context modelling and encoding process is described in more detail in WD4: Working Draft 4 of High-Efficiency Video Coding, JCTVC-F803_d5, Draft ISO/IEC 23008-HEVC; 201x(E) 2011-10-28.

Figure 16:
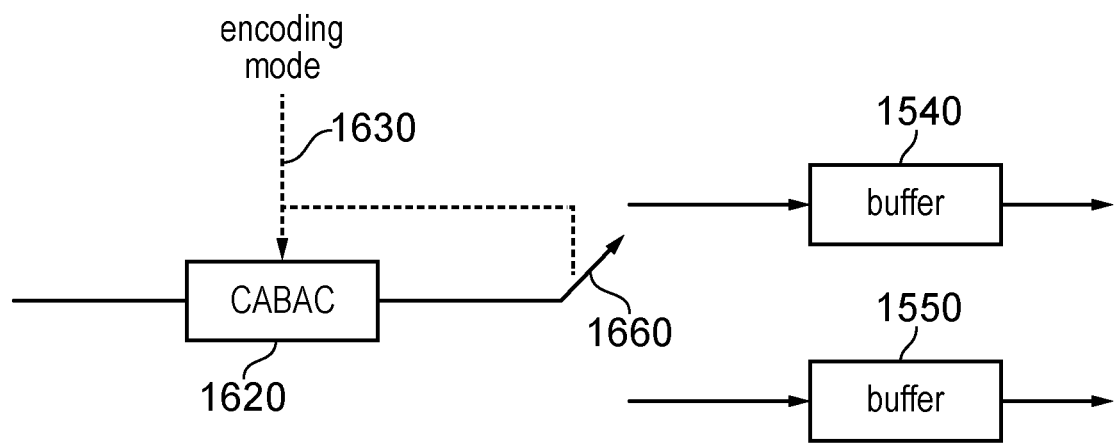

Referring now to FIGS. 15 and 16, an entropy encoder forming part of a video encoding apparatus comprises a first encoding system (for example an arithmetic coding encoding system such as a CABAC encoder 1500) and a second encoding system (such as a bypass encoder 1510), arranged so that a particular data word or value is encoded to the final output data stream by either the CABAC encoder or the bypass encoder but not both. In embodiments of the invention, the data values passed to the CABAC encoder and to the bypass encoder are respective subsets of ordered data values split or derived from the initial input data (the reordered quantised DCT data in this example), representing different ones of the set of "maps" generated from the input data.

The schematic representation in FIG. 15 treats the CABAC encoder and the bypass encoder as separate arrangements. This may well be the case in practice, but in another possibility, shown schematically in FIG. 16, a single CABAC encoder 1620 is used as both the CABAC encoder 1500 and the bypass encoder 1510 of FIG. 15. The encoder 1620 operates under the control of an encoding mode selection signal 1630, so as to operate with an adaptive context model (as described above) when in the mode of the CABAC encoder 1500, and to operate with a fixed 50% probability context model when in the mode of the bypass encoder 1510.

A third possibility combines these two, in that two substantially identical CABAC encoders can be operated in parallel (similar to the parallel arrangement of FIG. 15) with the difference being that the CABAC encoder operating as the bypass encoder 1510 has its context model fixed at a 50% probability context model.

The outputs of the CABAC encoding process and the bypass encoding process can be stored (temporarily at least) in respective buffers 1540, 1550. In the case of FIG. 16, a switch or demultiplexer 1660 acts under the control of the mode signal 1630 to route CABAC encoded data to the buffer 1550 and bypass encoded data to the buffer 1540.

Figure 17:
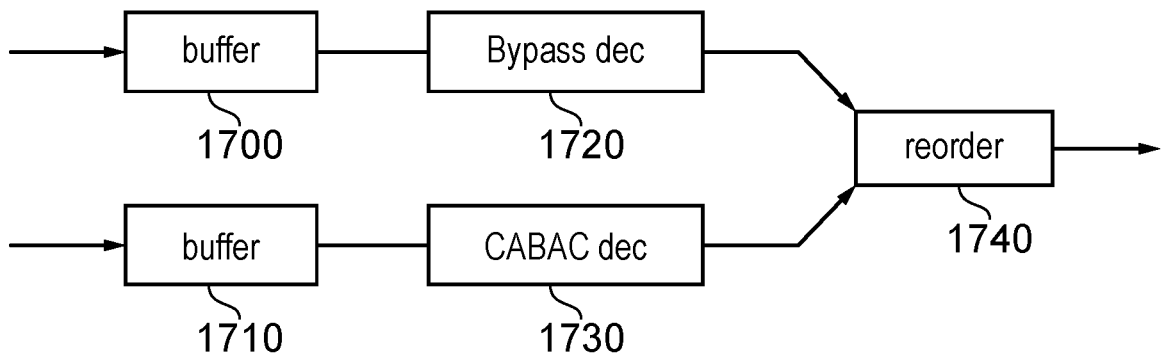
FIGS. 17 and 18 schematically illustrate CABAC decoding techniques.
Figure 18:
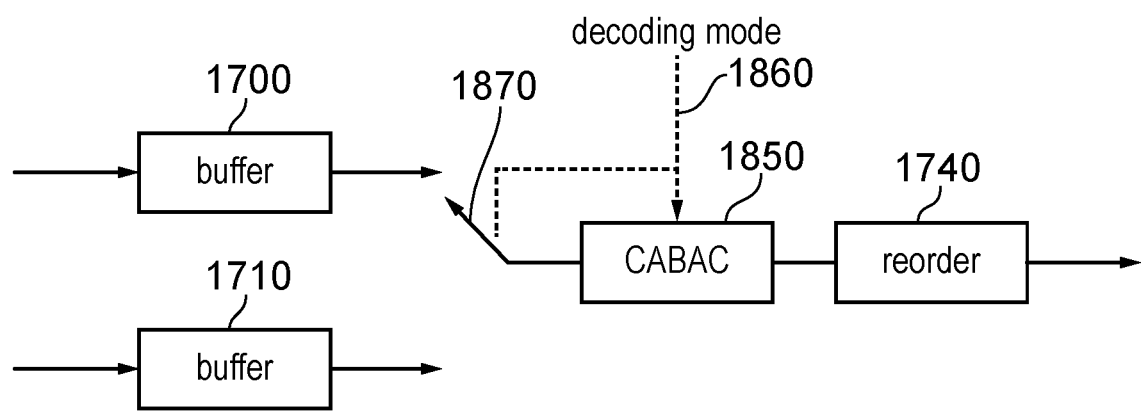

FIGS. 17 and 18 schematically illustrate examples of an entropy decoder forming part of a video decoding apparatus. Referring to FIG. 17, respective buffers 1710, 1700 pass data to a CABAC decoder 1730 and a bypass decoder 1720, arranged so that a particular encoded data word or value is decoded by either the CABAC decoder or the bypass decoder but not both. The decoded data are reordered by logic 1740 into the appropriate order for subsequent decoding stages.

The schematic representation in FIG. 17 treats the CABAC decoder and the bypass decoder as separate arrangements. This may well be the case in practice, but in another possibility, shown schematically in FIG. 18, a single CABAC decoder 1850 is used as both the CABAC decoder 1730 and the bypass decoder 1720 of FIG. 17. The decoder 1850 operates under the control of a decoding mode selection signal 1860, so as to operate with an adaptive context model (as described above) when in the mode of the CABAC decoder 1730, and to operate with a fixed 50% probability context model when in the mode of the bypass encoder 1720.

As before, a third possibility combines these two, in that two substantially identical CABAC decoders can be operated in parallel (similar to the parallel arrangement of FIG. 17) with the difference being that the CABAC decoder operating as the bypass decoder 1720 has its context model fixed at a 50% probability context model.

In the case of FIG. 18, a switch or multiplexer 1870 acts under the control of the mode signal 1860 to route CABAC encoded data to the decoder 1850 from the buffer 1700 or the buffer 1710 as appropriate.

Returning to the step 2215 if the context state implies that the block flag will not be unset then control passes to a step 2245. Note that on this path, the block flag BF will not be used. At the step 2245 a detection is made as to whether any GT1 flags are set for the unshaded region. If the answer is yes then at a step 2250 the appropriate GT1 block context is updated as though a 1 had been encoded. If no then at a step 2255 the appropriate GT1 block context is updated as though a 0 had been encoded. Control then passes to a step 2260 at which all flags (significance, GT1, GT2 and parity) are encoded for the unshaded coefficients. Control then passes to the step 2240.

Note that the context applicable to encoding the BF is updated in all circumstances other than when the preconditions are not met. If the outcome of the step 2215 is positive, the context for encoding the BF is updated as part of coding the BF either at the step 2225 or at the step 2230. If the BF is not coded (negative outcome of the step 2215) then the BF context is nevertheless updated (without actually coding the BF) at the steps 2255, 2250. Corresponding processes are carried out at the decoder as discussed below.

This updating, at the encoder and the decoder, provides an example in which the data encoder comprises a context adaptive binary arithmetic (CABAC) encoder to encode the indicator flags; and the data encoder is configured to select the first encoding mode or the second encoding mode in response to a CABAC context for encoding the indicator flags. For example, the data encoder may be configured to detect, from the CABAC context, whether the predetermined number of indicator flags are likely to be in a first state. For example, the data encoder may be configured not to encode the predetermined number of indicator flags when the detection indicates that the predetermined number of indicator flags are likely not to be in the first state; and the data encoder may be configured to update the CABAC context when the predetermined number of indicator flags are not encoded. Similar arrangements apply to the decoder.

The step 2215 provides an example in which the data encoder comprises a context adaptive binary arithmetic (CABAC) encoder to encode the sample range flags or the indicator flags; and the data encoder is configured to select the first encoding mode (the N outcome from the step 2215) or the second encoding mode (the Y outcome from the step 2215) in response to a CABAC context for encoding the sample range flags.

Note that the step 2260 is the destination from the step 2225 and also from the no outcome of the step 2210.

The path via the step 2235 (omitting the step 2260) provides an example in which, in the second encoding mode, the data encoder is configured not to encode to the output data stream the group of sample range flags in the case that the predicted state of the group of sample range flags is the same as the actual state of the group of sample range flags for the given array of sample values.

The step 2240 provides an example in which the data encoder is configured, in the second encoding mode, to encode a second group of sample range flags, complementary to the group of sample range flags, to the output data stream. For example, the sample values may represent frequency-separated data values, and the second group of sample range flags (the shaded group in FIG. 19) are respective sample range flags for a set of lowest frequency sample values. In other words, they may be earlier in a scanning order.

A single BF flag may be used as an example, or more than one such flag may be used per block.

As discussed above, a block of coefficient data (having been frequency-transformed or processed by a transform skip process, and then quantised) can be encoded as a number of data sets. For example, a significance map as mentioned above indicates a location of "significant" (non-zero) coefficients. A significance flag can be coded for each significant coefficient location in a block or sub-block.

A "level greater than one" (GT1) flag indicates whether the level is greater than 1 for each of the flagged significant coefficients. In some examples, the GT1 flag is encoded for all of the significant coefficients and in other examples, the GT1 flag may be encoded for no more than a predetermined upper limit of significant coefficients.

A "level greater than 2" flag (GT2) indicates if the particular coefficient level is greater than 2, at least for a first such coefficient in a block scanning order. This flag is encoded only for coefficients indicated as being larger than one by the GT1 flag.

A coefficient sign is indicated for the significant coefficients.

A parity flag may be provided.

A remaining absolute level or escape code is used to represent level information which has not been encoded by the data sets listed above.

This is just an example of how a group of data sets may be used and other examples are possible. It is not a requirement that the data itself represents image data; other types of data to which these techniques could be applicable may include sensor data or the like.

The data sets may be generated according to a so-called scanning order with respect to a block or array of coefficients. This scanning order may consider the coefficients in an order of [generally larger and more significant coefficients] to [smaller or less significant coefficients]. An example of such a scanning order is a so-called up-right zig-zag scan. In some examples, larger blocks or arrays may be partitioned into sub-blocks and each one treated individually from the point of view of scanning, with a scanning pattern being used in order to move from one sub-block to a next sub-block to be handled. In examples, therefore, the data encoder comprises a spatial frequency transformed configured to operate with respect to transform units of sample values, and in which the array of samples comprises: a transform unit or a subset of a transform unit.

With regard to the GT1 flags, these are an example of sample range flags each indicative of whether a respective sample value of an array of sample values lies in a predetermined range (for example, more than 1) of sample values. Other ranges could be used instead.

In an example array of sample or coefficient values 1900 (FIG. 19), assuming that in this example the sample data has been frequency-separated, for example by a DCT process, with lower spatial frequencies shown towards the upper left of the array as drawn, it is likely that the more significant coefficients will tend to lie from the upper left of the array.

In the present examples, in a first encoding mode, all of the GT1 flags (or at least all up to the predetermined limit of GT1 flags) are encoded to the output data stream as discussed above. It is possible to do this by various techniques, for example by a CABAC encoding or by a bypass (equiprobable) coding with a 50% probability threshold. In the present examples, a CABAC encoding process is used for the GT1 flags and for indicator flags to be discussed below.

Having said that, in many instances, most of the GT1 flags are in fact zero. It can be burdensome to encode these using CABAC encoding. For example, this may make the encoding too efficient so that in order to comply with data rate constraints, padding data has to be inserted at the end of an output data unit such as a picture or slice. Example embodiments therefore aim to avoid the need to encode many successive zero-valued bits using a CABAC encoder.

One way to do this is to generate a prediction of the state of the GT1 flag for at least a group of the GT1 flags. The prediction may be a prediction that the group of GT1 flags are all zero. For example, the GT1 flags for shaded example locations 1910 in FIG. 19 could be encoded as individual flags, but given the likelihood that the remaining unshaded GT1 flags will all be zero, a single indicator flag or a small number of indicator flags could be used to represent this situation. Techniques for achieving this will be discussed below.

Figure 19:
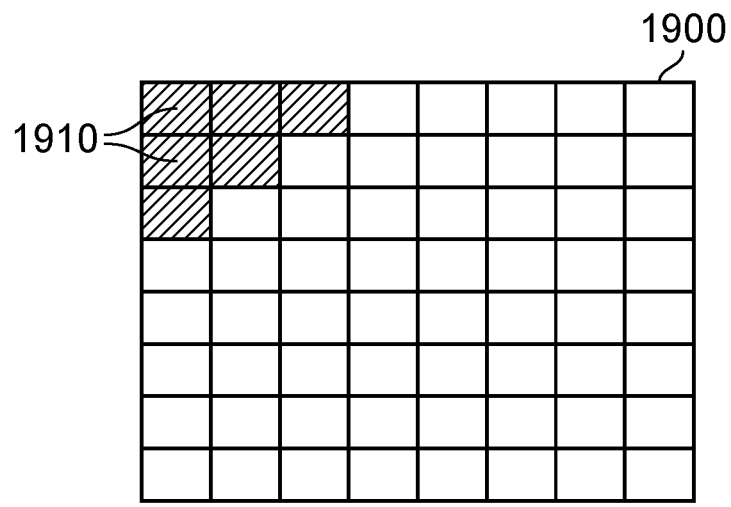
FIG. 19 schematically illustrates an array of data values.

The number of GT1 flags within the shaded group 1910 in FIG. 19 can vary, for example in dependence upon the block size and, where frequency transformation is used, the transform type (DCT or DST for example).

Figure 20:
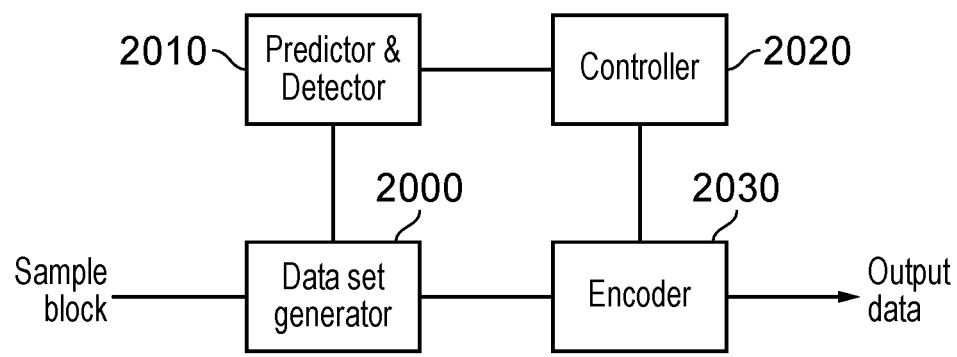
FIGS. 20 and 21 schematically illustrate respective apparatus.

FIG. 20 schematically illustrates aspects of the encoder of FIG. 14, in that a block of samples is received by a data set generator 2000 which, as discussed above, scans the block according to the scanning order so as to generate the various data sets discussed earlier.

A predictor and detector 2010 predicts values for a group of the GT1 flags and performs a comparison to detect whether the predicted values corresponds to the actual values. This information is used by a controller 2020 which controls operations of the CABAC (or indeed bypass in other examples) encoder 2030 to generate output data. Techniques by which this is performed will be discussed below.

At the decoder side (FIG. 21), an input data stream potentially including indicator flags to be discussed below is received by a flag detector 2100. The detection of the flags is communicated to a controller 2110 which controls operations of the CABAC or bypass decoder 2120.

Note that the controller 2020 and/or the controller 2110 can be implemented as part of the operation of the controller 30043 discussed above.

Figure 22:
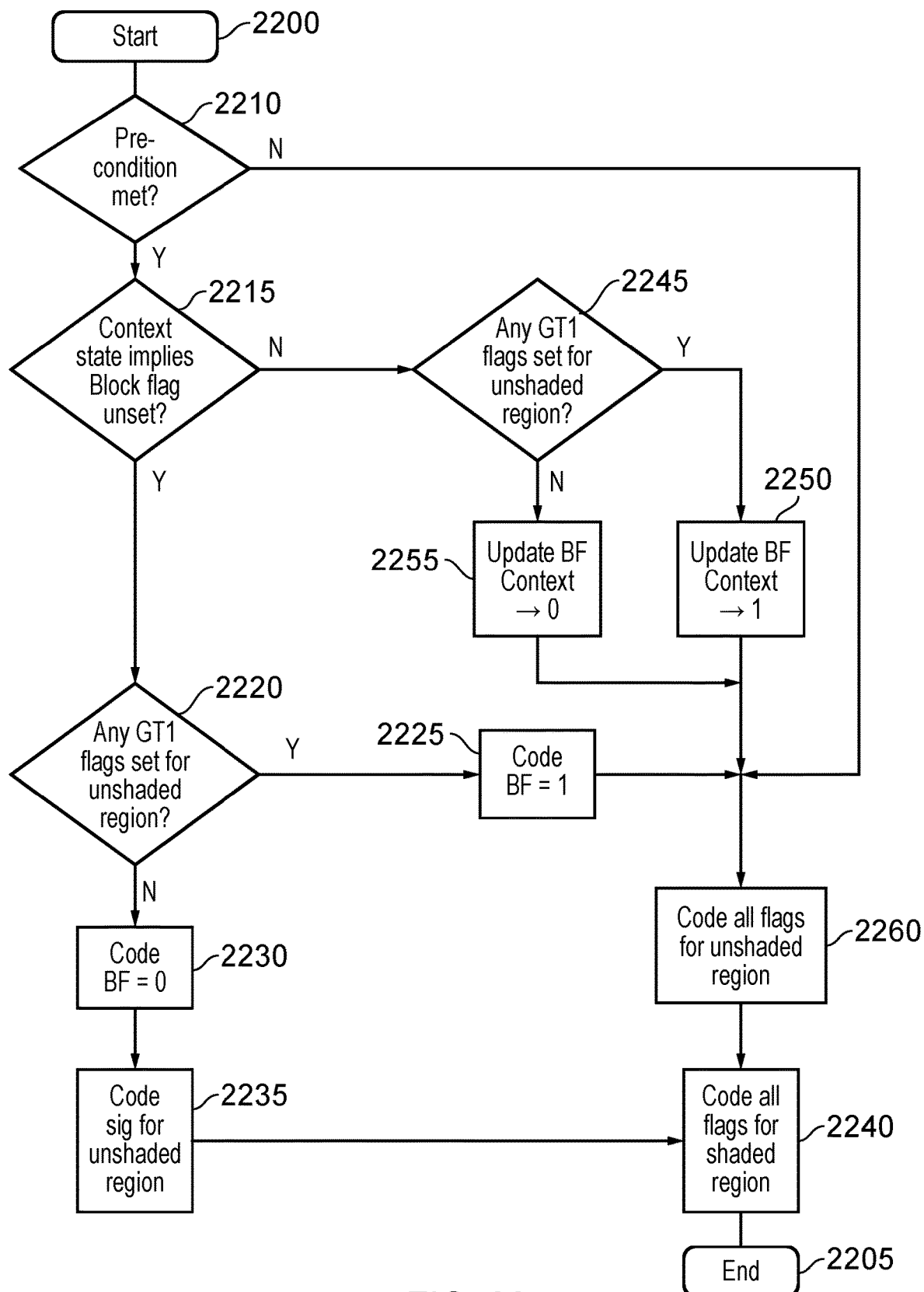
FIGS. 22 to 28 are schematic flowcharts illustrating respective methods.

FIG. 22 is a schematic flowchart illustrating a technique as performed at the encoder at FIG. 20. The process, in connection with the encoding of GT1 flags for a particular block or array starts at a step 2200 and ends at a step 2205.

The process aims to selectively generate a GT1 block flag (BF) in a second encoding mode of the encoder 2030. If the BF flag is encoded and is "unset" (BF=0) this indicates that a prediction that the GT1 flags of the unshaded region of FIG. 19 are 0 is correct. If the BF flag is encoded but is "set" (BF=1) then the prediction is incorrect. There are in fact 3 types of outcome of the process shown in FIG. 22 and to be described below $1^{st}$ encoding mode; BF is not encoded and/or normal GT1 flags are encoded in full according to the standard in use;

$2^{nd}$ encoding mode; BF=0, GT1 flags for unshaded region are not encoded because the prediction is correct. In other words, fewer GT1 flags are encoded than in the $1^{st}$ encoding mode; or $2^{nd}$ encoding mode; BF=1. BF is encoded but the prediction is incorrect and all of the GT1 flags for all of the unshaded region (as defined by the standard in use) still have to be encoded.

Therefore, if there are too many instances of the second encoding mode where BF is encoded but in which the prediction is incorrect, this can lead to a marginal increase in data rate. However, whenever the second encoding mode is used and the prediction is correct, this can lead to a decrease in data rate.

Returning to FIG. 22, at a step 2210, detection is made as to whether a pre-condition is met in order to make use of the second encoding mode. The pre-condition is dependent upon a block size, last significant coefficient location and transform type, and/or the state of the CABAC context used to encode the BF flags.

This provides an example in which the predictor is responsive to a location, in a predetermined scanning order of the array of sample values, of a last sample value of at least a predetermined magnitude. In other examples the predictor is responsive to an array size of the array of sample values. In other examples, the predictor is responsive to a state of indicator flags for one or more previously encoded arrays of sample values. In other examples, the sample values represent image data of a plurality of images; the data encoder is configured to generate the sample values in dependence upon differences between image data values and respective predictions of the image data values; the data encoder is configured to generate the predictions of the image data values by an intra-image prediction process or an inter-image prediction process. In other examples, the predictor is responsive to whether the given array of sample values was generated from predicted image data values using an intra-image prediction process or an inter-image prediction process. In other examples, the predictor is responsive to whether the sample values represent luminance or chrominance image data. These examples can be combined.

Assuming that the pre-condition is met, control passes to a step 2215 at which a detection is made as to whether the state of the CABAC context for encoding the BF flag implies that the flag BF (if generated) is likely to be unset (that is to say, the prediction is likely to be correct). This can be indicated by comparing the context to a threshold such as 0.25 (25% likely to be set). In other examples, a range of context values could be tested for.

Note that multiple contexts are used for GT1 blocks and may be defined by a combination of 1 or more block size, encoding prediction type (intra/inter), data type (luminance/chrominance) transform type (DCT/DST/transform skip) and location of last significant coefficient.

Assuming that the answer at the step 2215 then the context block flag BF is going to be generated therefore at a step 2220, the prediction that all of the unshaded GT1 flags are 0 is tested so that the step 2220 detects whether any GT1 flags are set (not 0) for the unshaded region of FIG. 19. If the answer is yes then the prediction (that they are all 0) is incorrect and control passes to a step 2225 at which a block flag BF of 1 (set) is encoded. If the answer to the step 2220 is no (the prediction is correct) then control passes to a step 2230 at which BF=0 is encoded. Then, at a step 2235, the significance flag is encoded for the unshaded coefficients and control passes to a step 2240 at which all flags are encoded for the shaded coefficients (significance, GT1, GT2, parity) and the process ends at the step 2205.

Returning to the step 2215 if the context state implies that the block flag will not be unset then control passes to a step 2245. Note that on this path, the block flag BF will not be used. At the step 2245 a detection is made as to whether any GT1 flags are set for the unshaded region. If the answer is yes then at a step 2250 the appropriate GT1 block context is updated as though a 1 had been encoded. If no then at a step 2255 the appropriate GT1 block context is updated as though a 0 had been encoded. Control then passes to a step 2260 at which all flags (significance, GT1, GT2 and parity) are encoded for the unshaded coefficients. Control then passes to the step 2240.

Note that the context applicable to encoding the BF is updated in all circumstances other than when the pre-conditions are not met. If the outcome of the step 2215 is positive, the context for encoding the BF is updated as part of coding the BF either at the step 2225 or at the step 2230. If the BF is not coded (negative outcome of the step 2215) then the BF context is nevertheless updated (without actually coding the BF) at the steps 2255, 2250. Corresponding processes are carried out at the decoder as discussed below.

The step 2215 provides an example in which the data encoder comprises a context adaptive binary arithmetic (CABAC) encoder to encode the sample range flags or the indicator flags; and the data encoder is configured to select the first encoding mode (the N outcome from the step 2215) or the second encoding mode (the Y outcome from the step 2215) in response to a CABAC context for encoding the sample range flags.

Note that the step 2260 is the destination from the step 2225 and also from the no outcome of the step 2210.

Figure 23:
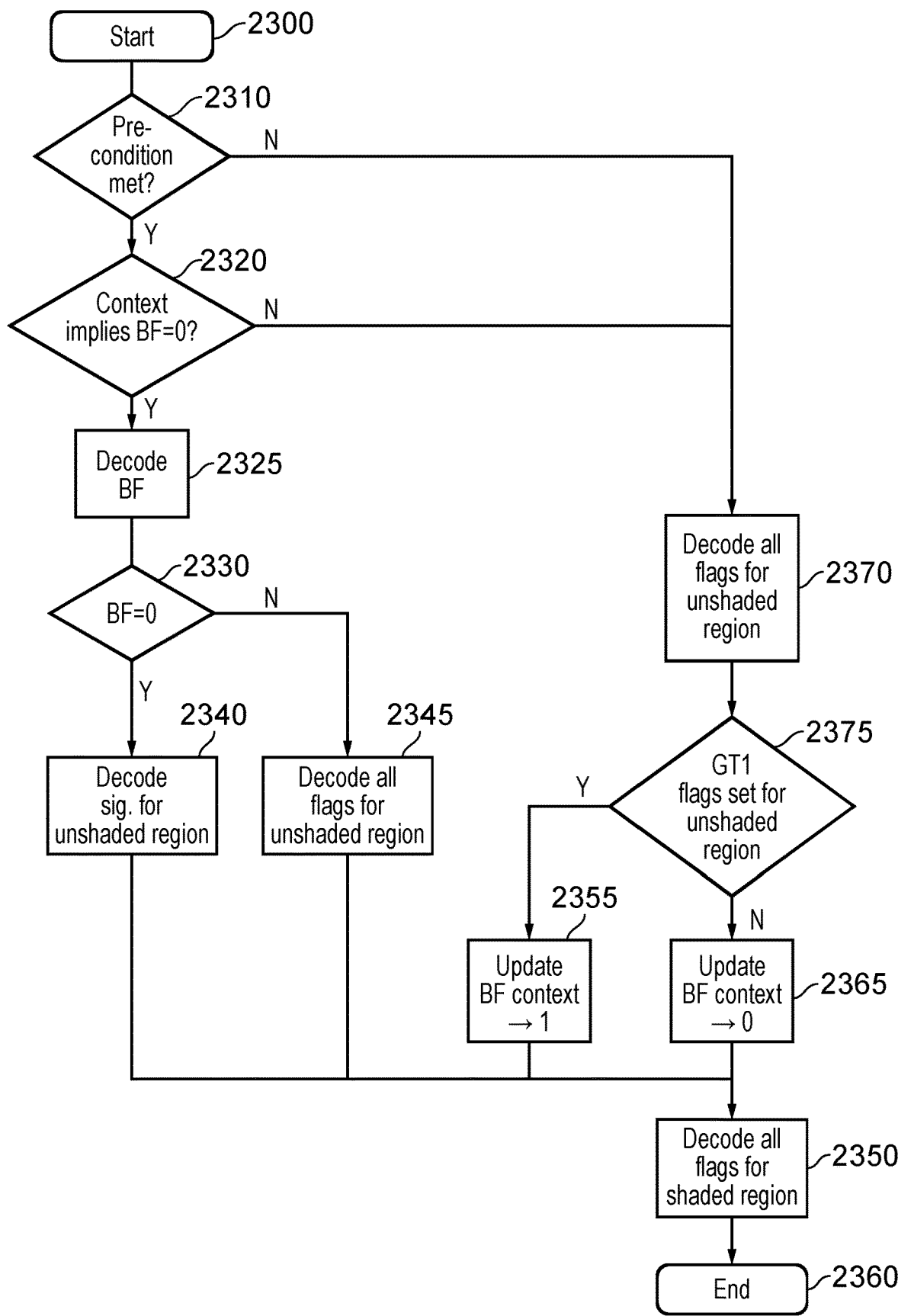

FIG. 23 is a schematic flowchart, similar and complementary to that of FIG. 22, showing operations at a decoder. Criteria and features correspond generally to those discussed above for the encoding side.

From a start 2300, a test is performed at a step 2310 as to whether the pre-condition is met (the same pre-condition as used in FIG. 22). If yes, then at a step 2320 a test is performed as to whether the BF context implies (for example by a 75% likelihood) that BF would be generated unset. If yes then at a step 2325 the BF flag is decoded and at a step 2330 it is compared to zero. If it is zero, then at a step 2340 the significance flag for the unshaded coefficients is decoded (and the GT1 flags are set to the prediction of all zeros). If not then at a step 2345 all flags are decoded for the unshaded region. Control passes to a step 2350 at which all flags for the shaded region are decoded before the process ends at a step 2360.

Returning to the negative outcome of either of the steps 2310, 2320 control passes to a step 2370 at which all flags are decoded for the unshaded region. With the decoded flags now available, the GT1 flags for the unshaded region are compared to a prediction of all zeroes at a step 2375. If any of the GT1 flags is set then at a step 2355 the BF context is updated as though a 1 had been decoded (though nothing is decoded). If not (if all zero) then the BF context is updated at a step 2365 as though a 1 had been decoded (though nothing is decoded). These steps keep the BF context up to date with that at the encoder. Then control then passes to the step 2350 discussed above.

The arrangement of FIG. 20, operating in accordance with the method of FIG. 22, provides an example of apparatus comprising:

a data encoder 2030 configured to derive, from an array of sample values, sample range flags each indicative of whether one or more sample values of the array of sample values lies in a predetermined range of sample values, the data encoder being configured in a first encoding mode to encode the array of sample values, at least in part, by encoding the sample range flags to an output data stream;

a predictor 2010 configured to predict the state of a group of the sample range flags for a given array of sample values, the group being at least a subset of the sample range flags; and a comparator 2010 configured to compare the predicted state of the group of sample range flags with the actual state of the respective sample range flags for the given array of sample values;

the data encoder being configured, in response to the comparator, to encode the given array of samples values in a second encoding mode in which the encoder is configured to encode to the output data stream a predetermined number of indicator flags, fewer than the group of sample range flags, to indicate whether the predicted state of the group of sample range flags is the same as the actual state of the group of sample range flags for the given array of sample values.

Figure 21:
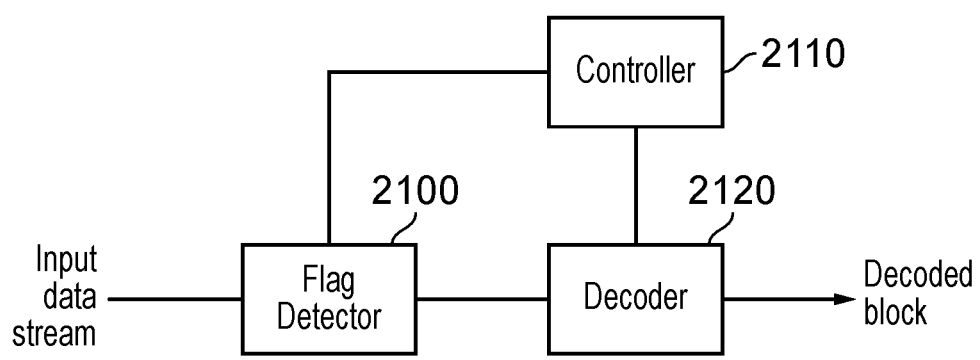

The arrangement of FIG. 21, operating in accordance with the method of FIG. 23, provides an example of apparatus comprising:

a data decoder 2120 configured, in a first decoding mode, to decode an array of sample values, at least in part, from sample range flags in an input data stream each indicative of whether one or more sample values of the array of sample values lie in a predetermined range of sample values; and a predictor 2110 configured to predict the state of a group of the sample range flags for a given array of sample values, the group being at least a subset of the sample range flags;

the data decoder being configured to decode the given array of samples values in a second encoding mode in which the data decoder is configured to detect in the input data stream a predetermined number of indicator flags, fewer than the group of sample range flags, indicating whether the predicted state of the group of sample range flags is the same as the actual state of the group of sample range flags for the given array of sample values.

Further examples will now be described.

Figure 24:
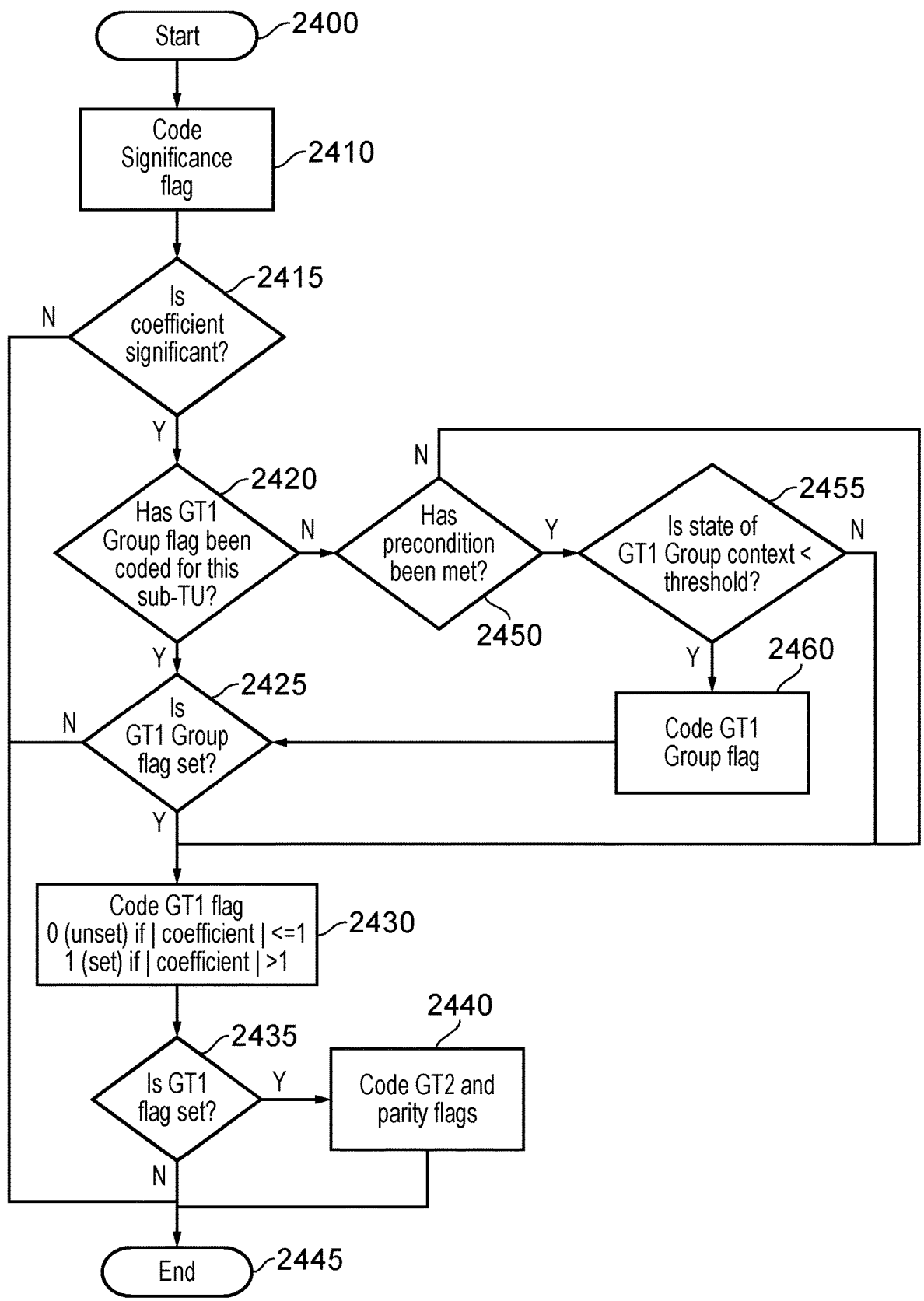

FIG. 24 schematically illustrates a similar process for coding the GT1 flags, although instead of coding a single block flag BF the process of FIG. 24 applies one GT1 group flag for each sub-TU (transform unit). In some examples, transform units are encoded as multiple sub-TUs, where a sub-TU might be, for example, a 4×4 array of coefficients.

The process starts 2400 for each coefficient and then the significance flag is coded at a step 2410.

For a current coefficient, a detection is made at a step 2415 as to whether the coefficient is significant. If the answer is yes then control passes to a step 2420 at which a detection is made as to whether a GT1 group flag has been coded for this sub-TU. If the answer is yes then at a step 2425 it is detected whether the GT1 group flag is set. If the answer is yes the control passes to a step 2430 at which the GT1 flag is coded as 0 if the magnitude of the current coefficient is less than or equal to 1, or 1 if the magnitude of the current coefficient is greater than 1.

At a step 2435, if the GT1 flag is set then control passes to a step 2440 at which the GT2 (greater than 2) and parity flags are coded before the process ends 2445.

The negative outcomes of the steps 2415 and 2425 pass directly to the end 2445.

The negative outcome of the step 2420 (the GT1 group flag has not been coded) passes control to a step 2450 at which it is detected whether a pre-condition such as the preconditions listed above have been met. Further examples of preconditions may be based upon the size of the TU, the position of the sub-TU within the TU, the position of the first significant coefficient in the sub-TU, whether the current prediction mode is intra or inter, the TU type (DCT/DST) and the like.

If the precondition is met then control passes to a step 2455 at which the state of the GT1 group flag context is compared to a threshold. If less than a threshold then control passes to a step 2460 at which the GT1 group flag is coded and control passes back to the step 2425. If more than the threshold then control passes to the step 2430. Similarly, if the precondition is not met at the step 2450 then control passes to the step 2430.

As mentioned above, the flowchart of FIG. 24 applies for each coefficient in a sub-TU and follows the derivation of the GT1 group flag from the set of coefficients. If, after all coefficients have been coded, the GT1 group flag has not been coded then the context for the GT1 group flag is updated with the state of the GT1 group flag.

Figure 25:
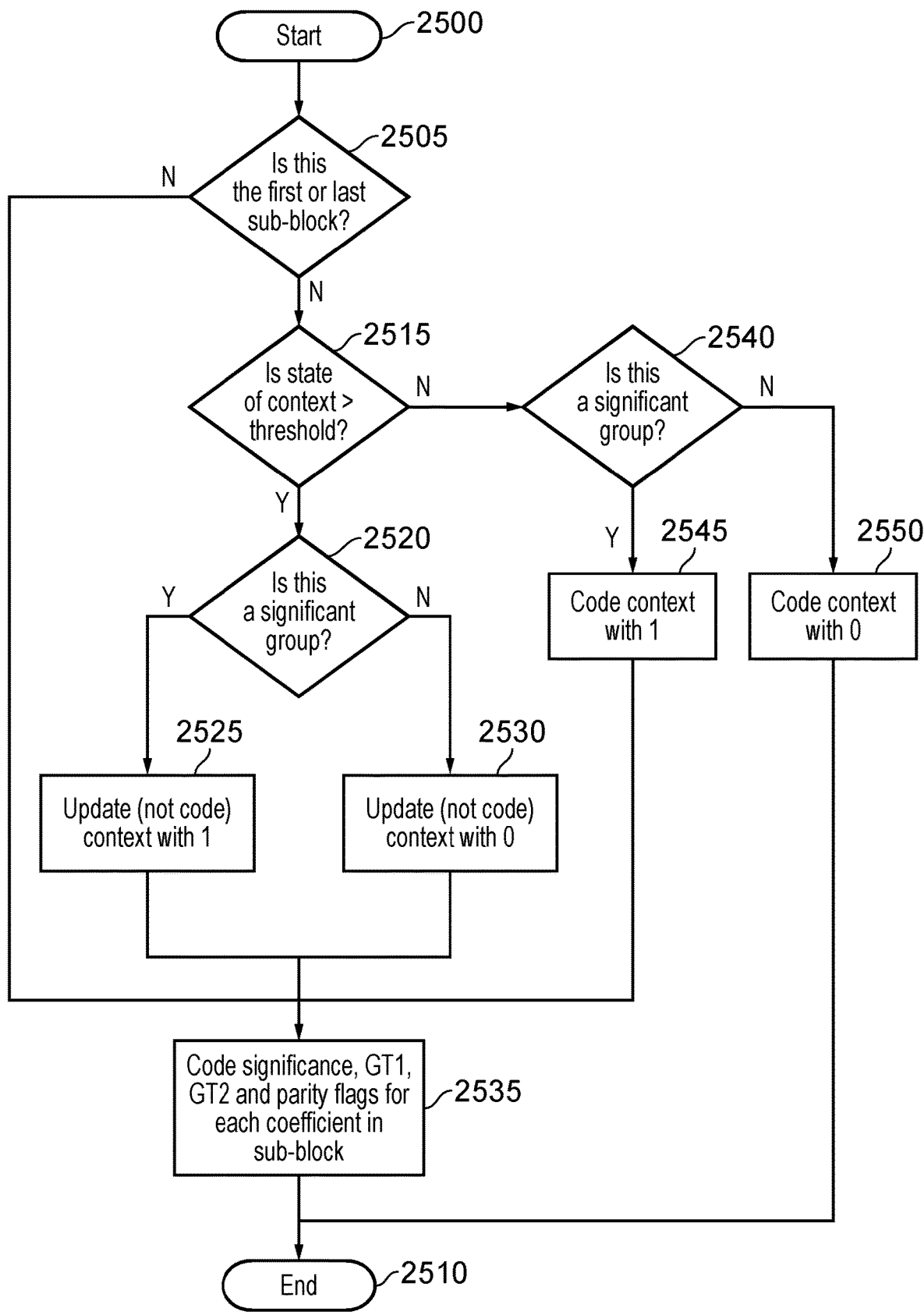
Figure 26:
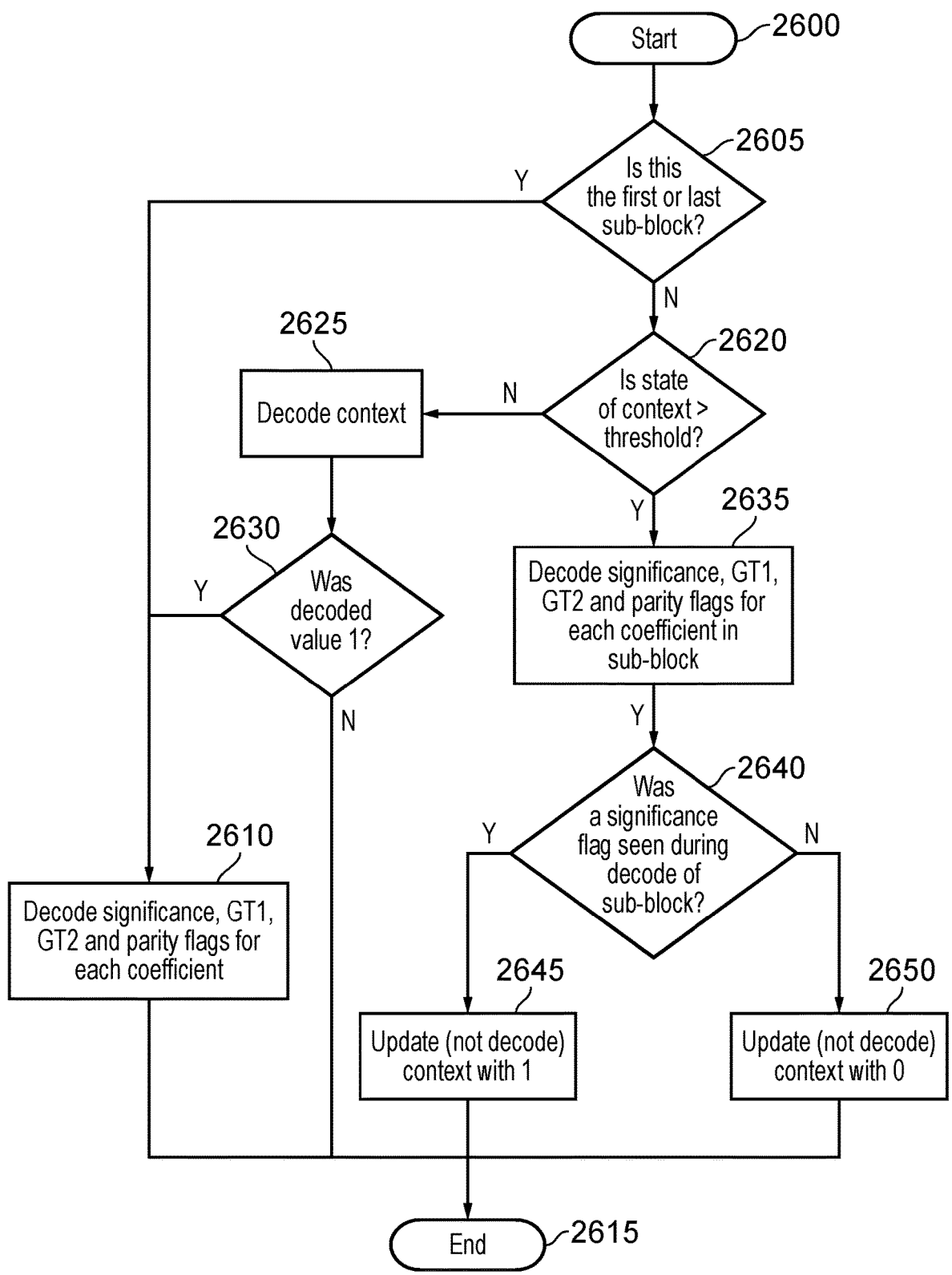

As another example, FIGS. 25 and 26 relate to the coding of the significance map using similar techniques, where once again the significance map is an example of an arrangement of sample range flags. The flowchart of FIG. 25 relates to encoding operations and the flowchart of FIG. 26 relates to decoding operations.

Referring to FIG. 25, from a start 2500 a detection is made at a step 2505 as to whether this is the first or last sub-block. This is carried out because the first sub-block is expected to contain significant coefficients, and the last sub-block always has significant coefficients (by virtue of being the last significant sub-block). Note that the first sub-block can be the same sub-block as the last sub-block in some circumstances.

If the outcome at the step 2505 is yes then the process passes to a step 2535 at which the significance, GT1, GT2 and parity flags are coded for each coefficient in each sub-block and ends at a step 2510. If not, control passes to a step 2515 at which he state of the context used to code the significance flag is compared to a threshold. If it is greater than the threshold then control passes to a step 2520 at which a detection is made as to whether this is a significant group. If yes, then the significance flag context is updated but not encoded as though as 1 had been coded at step 2525. If no then once again the context is updated but not coded as if a 0 had been coded at a step 2530. Control then passes to the step 2535 at which the significance, GT1, GT2 and parity flags are coded for each coefficient in each sub-block.

Returning to the negative outcome of the step 2515, control passes to a step 2540 at which a detection is made as to whether this is a significant group. If the answer is yes then the significance flag context ids coded with a value of 1 at a step 2545 and if no it is coded with a value of 0 at a step 2550, and the process ends.

So, in a similar way to the process described above, the significance flag context id always updated whether by explicit coding (2445, 2555) or simple updating (2525, 2530). If the prediction that this is not a significant group is correct then there is no need to code the flags at the step 2535 and instead the significance flag is simply encoded at the step 2550.

Referring to FIG. 26, corresponding steps at the decoder start 2600 and then a test is performed at a step 2605 as to whether this is the first or last sub-block. If yes then control passes to a step 2610 at which significance, GT1, GT2 and parity flags are decoded for each coefficient before the process ends 2615. If no, then at a step 2620 the state of the context is compared to the threshold. If it is below the threshold, implying that a prediction of the significance state is likely to be correct, then at the step 2625 the context is decoded. If the decoded value was 1 at a step 2630, then control passes to a step 2610. If the decoded value was not 1 then the process ends 2615.

Returning to the step 2620, at the positive outcome control passes to a step 2635 at which significance, GT1, GT2 and parity flags for each coefficient in the sub-block are decoded before control passes to a step 2640 at which it is detected whether a significance flag was observed during the decoding of the sub-block. If yes, then once again to keep the context alive at a step 2645 the context at the decoder is updated as though a 1 had been decoded. If no then at a step 2650 the context at the decoder is updated as though a 0 had been decoded.

Figure 27:
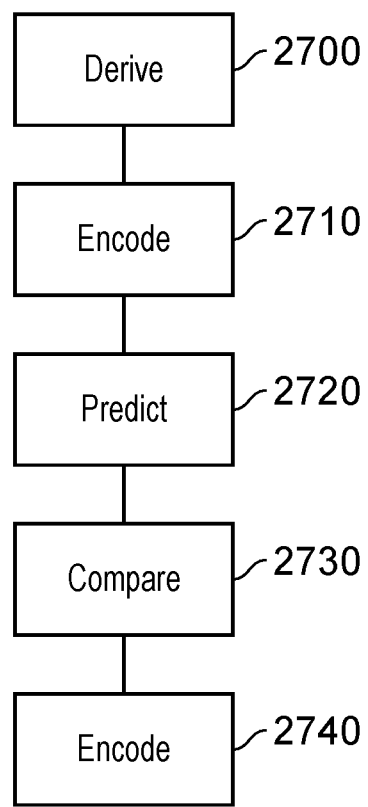

By way of summary, FIG. 27 is a schematic flowchart illustrating a method comprising: deriving (at a step 2700), from an array of sample values, sample range flags each indicative of whether a respective sample value of the array of sample values lies in a predetermined range of sample values;

encoding (at a step 2710), in a first encoding mode, the array of sample values, at least in part, by encoding the sample range flags to an output data stream;

predicting (at a step 2720) the state of a group of the sample range flags for a given array of sample values, the group being at least a subset of the sample range flags; comparing (at a step 2730) the predicted state of the group of sample range flags with the actual state of the respective sample range flags for the given array of sample values; and in response to the comparing step, encoding (at a step 2740) the given array of samples values in a second encoding mode by encoding to the output data stream a predetermined number of indicator flags, fewer than the group of sample range flags, to indicate whether the predicted state of the group of sample range flags is the same as the actual state of the group of sample range flags for the given array of sample values.

Figure 28:
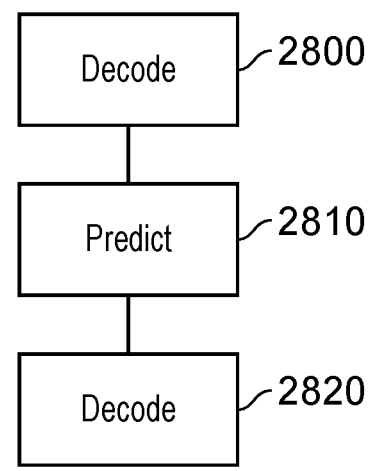

FIG. 28 is a schematic flowchart illustrating a method comprising:

decoding (at a step 2800), in a first decoding mode, to decode an array of sample values, at least in part, from sample range flags in an input data stream each indicative of whether a respective sample value of the array of sample values lies in a predetermined range of sample values;

predicting (at a step 2810) the state of a group of the sample range flags for a given array of sample values, the group being at least a subset of the sample range flags;

decoding (at a step 2820) the given array of samples values in a second encoding mode in which the data decoder is configured to detect in the input data stream a predetermined number of indicator flags, fewer than the group of sample range flags, indicating whether the predicted state of the group of sample range flags is the same as the actual state of the group of sample range flags for the given array of sample values.

In each case, embodiments of the disclosure are represented by computer software which, when executed by a computer, causes the computer to carry out the respective method and by a machine-readable non-transitory storage medium which stores such computer software. In the case of encoding methods, embodiments of the disclosure are represented by a data signal comprising coded data generated according to the respective method.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Respective aspects and features are defined by the following numbered clauses:

1. Apparatus comprising:
    a data encoder configured to derive, from an array of sample values, sample range flags each indicative of whether one or more sample values of the array of sample values lie in a predetermined range of sample values, the data encoder being configured in a first encoding mode to encode the array of sample values, at least in part, by encoding the sample range flags to an output data stream;
    a predictor configured to predict the state of a group of the sample range flags for a given array of sample values, the group being at least a subset of the sample range flags; and
    a comparator configured to compare the predicted state of the group of sample range flags with the actual state of the respective sample range flags for the given array of sample values;
    the data encoder being configured, in response to the comparator, to encode the given array of samples values in a second encoding mode in which the encoder is configured to encode to the output data stream a predetermined number of indicator flags, fewer than the group of sample range flags, to indicate whether the predicted state of the group of sample range flags is the same as the actual state of the group of sample range flags for the given array of sample values.

2. Apparatus according to clause 1, in which, in the second encoding mode, the data encoder is configured not to encode to the output data stream the group of sample range flags in the case that the predicted state of the group of sample range flags is the same as the actual state of the group of sample range flags for the given array of sample values.

3. Apparatus according to clause 1 or 2, in which:
    the data encoder is configured, in the second encoding mode, to encode a second group of sample range flags, complementary to the group of sample range flags, to the output data stream.

4. Apparatus according to clause 3, in which:
    the sample values represent frequency-separated data values; and
    the second group of sample range flags are respective sample range flags for a set of lowest frequency sample values.

5. Apparatus according to any one of the preceding clauses, in which the predetermined number of indicator flags is one indicator flag.

6. Apparatus according to any one of the preceding clauses, in which the predictor is responsive to a location, in a predetermined scanning order of the array of sample values, of a last sample value of at least a predetermined magnitude.

7. Apparatus according to any one of the preceding clauses, in which the predictor is responsive to an array size of the array of sample values.

8. Apparatus according to any one of the preceding clauses, in which the predictor is responsive to a state of indicator flags for one or more previously encoded arrays of sample values.

9. Apparatus according to any one of the preceding clauses, in which:
    the sample values represent image data of a plurality of images;
    the data encoder is configured to generate the sample values in dependence upon differences between image data values and respective predictions of the image data values;

the data encoder is configured to generate the predictions of the image data values by an intra-image prediction process or an inter-image prediction process.

10. Apparatus according to clause 9, in which the predictor is responsive to whether the given array of sample values was generated from predicted image data values using an intra-image prediction process or an inter-image prediction process.

11. Apparatus according to clause 9 or 10, in which the predictor is responsive to whether the sample values represent luminance or chrominance image data.

12. Apparatus according to any one of clauses 9 to 11, in which the data encoder comprises a spatial frequency transformed configured to operate with respect to transform units of sample values, and in which the array of samples comprises:
a transform unit;
a subset of a transform unit 13. Apparatus according to any one of the preceding clauses, in which:
the data encoder comprises a context adaptive binary arithmetic (CABAC) encoder to encode the indicator flags; and
the data encoder is configured to select the first encoding mode or the second encoding mode in response to a CABAC context for encoding the indicator flags.

14. Apparatus according to clause 13, in which:
the data encoder is configured to detect, from the CABAC context, whether the predetermined number of indicator flags are likely to be in a first state.

15. Apparatus according to clause 14, in which:
the data encoder is configured not to encode the predetermined number of indicator flags when the detection indicates that the predetermined number of indicator flags are likely not to be in the first state; and
the data encoder is configured to update the CABAC context when the predetermined number of indicator flags are not encoded.

16. Apparatus comprising:
a data decoder configured, in a first decoding mode, to decode an array of sample values, at least in part, from sample range flags in an input data stream each indicative of whether one or more sample values of the array of sample values lie in a predetermined range of sample values; and
a predictor configured to predict the state of a group of the sample range flags for a given array of sample values, the group being at least a subset of the sample range flags;
the data decoder being configured to decode the given array of samples values in a second encoding mode in which the data decoder is configured to detect in the input data stream a predetermined number of indicator flags, fewer than the group of sample range flags, indicating whether the predicted state of the group of sample range flags is the same as the actual state of the group of sample range flags for the given array of sample values.

17. Apparatus according to clause 16, in which, in the second decoding mode, the data decoder is configured not to decode from the input data stream the group of sample range flags in the case that the predicted state of the group of sample range flags is the same as the actual state of the group of sample range flags for the given array of sample values.

18. Apparatus according to clause 16 or 17, in which:
the data decoder is configured, in the second decoding mode, to decode a second group of sample range flags, complementary to the group of sample range flags, from the input data stream.

19. Apparatus according to clause 18, in which:
the sample values represent frequency-separated data values; and
the second group of sample range flags are respective sample range flags for a set of lowest frequency sample values.

20. Apparatus according to any one of clauses 16 to 19, in which the predetermined number of indicator flags is one indicator flag.

21. Apparatus according to any one of clauses 16 to 20, in which the predictor is responsive to a location, in a predetermined scanning order of the array of sample values, of a last sample value of at least a predetermined magnitude.

22. Apparatus according to any one of clauses 16 to 21, in which the predictor is responsive to an array size of the array of sample values.

23. Apparatus according to any one of clauses 16 to 22, in which the predictor is responsive to a state of indicator flags for one or more previously decoded arrays of sample values.

24. Apparatus according to any one of clauses 16 to 23, in which:
the sample values represent image data of a plurality of images;
the data decoder is configured to generate the sample values in dependence upon differences between image data values and respective predictions of the image data values;
the data decoder is configured to generate the predictions of the image data values by an intra-image prediction process or an inter-image prediction process.

25. Apparatus according to clause 24, in which the predictor is responsive to whether the given array of sample values was generated from predicted image data values using an intra-image prediction process or an inter-image prediction process.

26. Apparatus according to clause 24 or 25, in which the predictor is responsive to whether the sample values represent luminance or chrominance image data.

27. Apparatus according to any one of clauses 24 to 26, in which the data decoder comprises a spatial frequency transformed configured to operate with respect to transform units of sample values, and in which the array of samples comprises:
a transform unit;
a subset of a transform unit 28. Apparatus according to any one of clauses 16 to 27, in which:
the data decoder comprises a context adaptive binary arithmetic (CABAC) decoder to decode the sample range flags or the indicator flags; and
the data decoder is configured to select the first decoding mode or the second decoding mode in response to a CABAC context for decoding the sample range flags.

29. Apparatus according to clause 28, in which:
the data decoder is configured to detect, from the CABAC context, whether the predetermined number of indicator flags are likely to be in a first state.

30. Apparatus according to clause 29, in which:
the data decoder is configured not to decode the predetermined number of indicator flags when the detection indicates that the predetermined number of indicator flags are likely not to be in the first state; and
the data decoder is configured to update the CABAC context when the predetermined number of indicator flags are not decoded.

31. A method comprising:
deriving, from an array of sample values, sample range flags each indicative of whether one or more sample values of the array of sample values lie in a predetermined range of sample values;
encoding, in a first encoding mode, the array of sample values, at least in part, by encoding the sample range flags to an output data stream;
predicting the state of a group of the sample range flags for a given array of sample values, the group being at least a subset of the sample range flags;
comparing the predicted state of the group of sample range flags with the actual state of the respective sample range flags for the given array of sample values; and
in response to the comparing step, encoding the given array of samples values in a second encoding mode by encoding to the output data stream a predetermined number of indicator flags, fewer than the group of sample range flags, to indicate whether the predicted state of the group of sample range flags is the same as the actual state of the group of sample range flags for the given array of sample values.

32. Computer software which, when executed by a computer, causes the computer to carry out the method of clause 31.

33. A machine-readable non-transitory storage medium which stores the computer software of clause 32.

34. A data signal comprising coded data generated according to the method of clause 31.

35. A method comprising:
decoding, in a first decoding mode, to decode an array of sample values, at least in part, from sample range flags in an input data stream each indicative of whether one or more sample values of the array of sample values lie in a predetermined range of sample values;
predicting the state of a group of the sample range flags for a given array of sample values, the group being at least a subset of the sample range flags;
decoding the given array of samples values in a second encoding mode in which the data decoder is configured to detect in the input data stream a predetermined number of indicator flags, fewer than the group of sample range flags, indicating whether the predicted state of the group of sample range flags is the same as the actual state of the group of sample range flags for the given array of sample values.

36. Computer software which, when executed by a computer, causes the computer to carry out the method of clause 35.

37. A machine-readable non-transitory storage medium which stores the computer software of clause 36.

The invention claimed is:

1. An apparatus, comprising:
processing circuitry configured to
derive, from an array of sample values, sample range flags each indicative of whether one or more sample values of the array of sample values lie in a predetermined range of sample values, the data encoder being configured in a first encoding mode to encode the array of sample values, at least in part, by encoding the sample range flags to an output data stream;
predict the state of a group of the sample range flags for a given array of sample values, the group being at least a subset of the sample range flags;
compare the predicted state of the group of sample range flags with the actual state of the respective sample range flags for the given array of sample values; and
in response to the comparator, encode the given array of samples values in a second encoding mode in which the processing circuitry is configured to encode to the output data stream a predetermined number of indicator flags, fewer than the group of sample range flags, to indicate whether the predicted state of the group of sample range flags is the same as the actual state of the group of sample range flags for the given array of sample values.

2. The apparatus according to claim 1, wherein, in the second encoding mode, the processing circuitry is further configured not to encode to the output data stream the group of sample range flags in the case that the predicted state of the group of sample range flags is the same as the actual state of the group of sample range flags for the given array of sample values.

3. The apparatus according to claim 1, wherein:
the processing circuitry is further configured, in the second encoding mode, to encode a second group of sample range flags, complementary to the group of sample range flags, to the output data stream.

4. The apparatus according to claim 3, wherein:
the sample values represent frequency-separated data values; and
the second group of sample range flags are respective sample range flags for a set of lowest frequency sample values.

5. The apparatus according to claim 1, wherein the predetermined number of indicator flags is one indicator flag.

6. The apparatus according to claim 1, wherein the processing circuitry is responsive to at least one of a location, in a predetermined scanning order of the array of sample values, of a last sample value of at least a predetermined magnitude, and an array size of the array of sample values.

7. The apparatus according to claim 1, wherein the processing circuitry is responsive to a state of indicator flags for one or more previously encoded arrays of sample values.

8. The apparatus according to claim 1, wherein:
the sample values represent image data of a plurality of images;
the processing circuitry is further configured to generate the sample values in dependence upon differences between image data values and respective predictions of the image data values; and
the processing circuitry is further configured to generate the predictions of the image data values by an intra-image prediction process or an inter-image prediction process.

9. The apparatus according to claim 1, wherein:
the processing circuitry comprises a context adaptive binary arithmetic (CABAC) encoder circuit to encode the indicator flags; and
the processing circuitry is further configured to select the first encoding mode or the second encoding mode in response to a CABAC context for encoding the indicator flags.

10. The apparatus according to claim 9, wherein:
the processing circuitry is further configured to detect, from the CABAC context, whether the predetermined number of indicator flags are likely to be in a first state; and the processing circuitry is further configured not to encode the predetermined number of indicator flags when the detection indicates that the predetermined number of indicator flags are likely not to be in the first state; and the processing circuitry is further configured to update the CABAC context when the predetermined number of indicator flags are not encoded.

11. An apparatus, comprising:

processing circuitry configured to in a first decoding mode, to decode an array of sample values, at least in part, from sample range flags in an input data stream each indicative of whether one or more sample values of the array of sample values lie in a predetermined range of sample values; and predict the state of a group of the sample range flags for a given array of sample values, the group being at least a subset of the sample range flags; and decode the given array of samples values in a second encoding mode in which the processing circuitry is configured to detect in the input data stream a predetermined number of indicator flags, fewer than the group of sample range flags, indicating whether the predicted state of the group of sample range flags is the same as the actual state of the group of sample range flags for the given array of sample values.

12. Apparatus according to claim 11, wherein, in the second decoding mode, the processing circuitry is further configured not to decode from the input data stream the group of sample range flags in the case that the predicted state of the group of sample range flags is the same as the actual state of the group of sample range flags for the given array of sample values.

13. The apparatus according to claim 11, wherein the predetermined number of indicator flags is one indicator flag.

14. The apparatus according to claim 11, wherein the processing circuitry is responsive to a state of indicator flags for one or more previously decoded arrays of sample values.

15. The apparatus according to claim 11, wherein:

the sample values represent image data of a plurality of images;

the processing circuitry is further configured to generate the sample values in dependence upon differences between image data values and respective predictions of the image data values; and the processing circuitry is further configured to generate the predictions of the image data values by an intra-image prediction process or an inter-image prediction process.

16. The apparatus according to claim 11, wherein:

the processing circuitry comprises a context adaptive binary arithmetic (CABAC) decoder circuit to decode the sample range flags or the indicator flags; and the processing circuitry is further configured to select the first decoding mode or the second decoding mode in response to a CABAC context for decoding the sample range flags.

17. A method, comprising:

deriving, from an array of sample values, sample range flags each indicative of whether one or more sample values of the array of sample values lie in a predetermined range of sample values;

encoding, in a first encoding mode, the array of sample values, at least in part, by encoding the sample range flags to an output data stream;

predicting the state of a group of the sample range flags for a given array of sample values, the group being at least a subset of the sample range flags;

comparing the predicted state of the group of sample range flags with the actual state of the respective sample range flags for the given array of sample values; and in response to the comparing step, encoding the given array of samples values in a second encoding mode by encoding to the output data stream a predetermined number of indicator flags, fewer than the group of sample range flags, to indicate whether the predicted state of the group of sample range flags is the same as the actual state of the group of sample range flags for the given array of sample values.

18. A non-transitory machine-readable storage medium having stored thereon computer program instructions which, when executed by a computer cause the computer to perform the method of claim 17.

19. A method, comprising:

decoding, in a first decoding mode, to decode an array of sample values, at least in part, from sample range flags in an input data stream each indicative of whether one or more sample values of the array of sample values lie in a predetermined range of sample values;

predicting the state of a group of the sample range flags for a given array of sample values, the group being at least a subset of the sample range flags; and decoding the given array of samples values in a second encoding mode in which the data decoder is configured to detect in the input data stream a predetermined number of indicator flags, fewer than the group of sample range flags, indicating whether the predicted state of the group of sample range flags is the same as the actual state of the group of sample range flags for the given array of sample values.

20. A non-transitory machine-readable storage medium having stored thereon computer program instructions which, when executed by a computer cause the computer to perform the method of claim 19.

* * * * *